United States Patent
Yang et al.

(10) Patent No.: US 12,056,192 B2
(45) Date of Patent: Aug. 6, 2024

(54) WORD COMPLETION METHOD AND APPARATUS

(71) Applicant: HUAWEI TECHNOLOGIES CO., LTD., Guangdong (CN)

(72) Inventors: Hui Yang, Shenzhen (CN); Jianxin Yang, Shenzhen (CN); Letian Feng, Beijing (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 18/096,952

(22) Filed: Jan. 13, 2023

(65) Prior Publication Data

US 2023/0195801 A1  Jun. 22, 2023

Related U.S. Application Data

(63) Continuation of application No. PCT/CN2021/098072, filed on Jun. 3, 2021.

(30) Foreign Application Priority Data

Jul. 15, 2020  (CN) .......................... 202010683199.8

(51) Int. Cl.
*G06F 16/90* (2019.01)
*G06F 16/31* (2019.01)
*G06F 16/33* (2019.01)
*G06F 16/903* (2019.01)

(52) U.S. Cl.
CPC ...... *G06F 16/90344* (2019.01); *G06F 16/322* (2019.01); *G06F 16/334* (2019.01)

(58) Field of Classification Search
CPC ............ G06F 16/90344; G06F 16/322; G06F 16/334; G06F 16/3322; G06F 16/31; G06F 40/216; G06F 16/9027
USPC ........................................... 707/722
See application file for complete search history.

(56) References Cited

U.S. PATENT DOCUMENTS

| | | | | |
|---|---|---|---|---|
| 8,676,828 | B1 * | 3/2014 | Agarwal | G06F 16/3322 |
| | | | | 706/14 |
| 8,700,654 | B2 * | 4/2014 | Mehanna | G06F 16/243 |
| | | | | 707/719 |
| 8,825,474 | B1 * | 9/2014 | Zhai | G06F 40/237 |
| | | | | 704/4 |
| 8,972,388 | B1 * | 3/2015 | Finkelstein | G06F 16/9535 |
| | | | | 707/723 |
| 9,158,758 | B2 * | 10/2015 | Hsu | G06F 40/274 |

(Continued)

FOREIGN PATENT DOCUMENTS

| CN | 110046298 A | 7/2019 |
|---|---|---|
| CN | 110851722 A | 2/2020 |

*Primary Examiner* — Hicham Skhoun
(74) *Attorney, Agent, or Firm* — WOMBLE BOND DICKINSON (US) LLP

(57) ABSTRACT

A word completion method and apparatus are described. The method is applied to a search scenario and is used to complete an incomplete word entered by a user. The method is based on an improved trie. Hot words are stored in some nodes of the trie. In the word completion method, a target node that matches a character string is searched in the trie, and at least one completed word is output to a user based on a hot word stored in the target node. Word completion efficiency is improved, and a case in which a word is recommended to a user when the user enters an excessively short character string is avoided.

16 Claims, 10 Drawing Sheets

(56) References Cited

U.S. PATENT DOCUMENTS

| | | | |
|---|---|---|---|
| 11,106,690 B1* | 8/2021 | Dhillon | G06N 5/01 |
| 11,475,053 B1* | 10/2022 | Das | G06F 16/3344 |
| 2004/0021691 A1* | 2/2004 | Dostie | G06F 3/04886 |
| | | | 715/773 |
| 2010/0235780 A1* | 9/2010 | Westerman | G06F 3/0237 |
| | | | 707/E17.07 |
| 2012/0166182 A1* | 6/2012 | Ko | G06F 40/58 |
| | | | 707/727 |
| 2012/0246133 A1* | 9/2012 | Hsu | G06F 40/274 |
| | | | 707/706 |
| 2015/0269176 A1* | 9/2015 | Marantz | G06F 16/90324 |
| | | | 707/767 |
| 2015/0347381 A1* | 12/2015 | Bellegarda | G06F 40/274 |
| | | | 704/9 |
| 2015/0347436 A1* | 12/2015 | Hiwale | G06F 16/90324 |
| | | | 707/706 |
| 2015/0347503 A1* | 12/2015 | Kumaran | G06F 16/3322 |
| | | | 707/767 |
| 2018/0225572 A1* | 8/2018 | Yan | G06N 7/01 |
| 2018/0349513 A1* | 12/2018 | Hornkvist | G06F 16/24578 |
| 2019/0324780 A1* | 10/2019 | Zhu | G06N 3/045 |
| 2020/0042104 A1* | 2/2020 | Kozhaya | G06F 40/274 |

* cited by examiner

WORD COMPLETION METHOD AND APPARATUS

CROSS-REFERENCE TO RELATED APPLICATIONS

This application is a continuation of International Application PCT/CN2021/098072, filed on Jun. 3, 2021, which application claims priority to Chinese Patent Application No. 202010683199.8, filed on Jul. 15, 2020. The disclosures of the aforementioned applications are hereby incorporated by reference in their entireties.

TECHNICAL FIELD

This application relates to the field of computer technologies, and in particular, to a word completion method and apparatus.

BACKGROUND

Location search is widely used in various application scenarios such as map navigation, traveling, and social communication. Location search specifically includes functions such as a query suggestion function, point of information (POI) search, and a function of obtaining POI details. The query suggestion function accounts for 75% of search requests, and may provide a user with a search suggestion for incomplete query text. In the query suggestion function, automatic completion can be performed when there is an incomplete input from the user, to provide the user with a hot text-related word (namely, a hot search word) or a hot POI.

In the conventional technology, when the user enters an incomplete character string, a server usually performs prefix matching in a hot word database based on the character string entered by the user, to enumerate all hot words that meet prefix matching, then sorts all the hot words that meet prefix matching in descending order of search popularity or the like, and selects top N results as hot words finally recommended to the user.

In an existing hot word completion method, prefix matching is performed based on a character string entered by the user, to obtain all hot words that meet prefix matching. There are usually an excessively large quantity of hot words that meet prefix matching, especially when a relatively short character string is entered. Therefore, there is low hot word search efficiency, and user experience is affected.

SUMMARY

Embodiments of this application provide a word completion method, to improve word completion efficiency and avoid a case in which a word is recommended to a user when the user enters an excessively short character string.

According to a first aspect of the embodiments of this application, a word completion method is provided, and includes: obtaining a character string entered by a user; and searching a trie for a target node that matches the character string, to output at least one word, where the trie includes a plurality of first nodes, the target node is one of the plurality of first nodes, each first node stores at least one word that includes a character string that includes characters passing through a path from a root node to the first node, and one or more words stored in the target node include the at least one output word.

In the word completion method provided in this embodiment of this application, an efficient trie structure is constructed, an improvement is made on the basis of a conventional trie, a hot word is stored in the node in the trie, and the stored hot word includes a character passing through a path from the root node to the node. The hot word stored in the node is a word with a relatively high completion probability. In other words, a hot word prefixed with an excessively short character string usually has a relatively low completion probability, and therefore is not stored in the node in the trie. In the word completion method, the improved trie is searched for the target node that matches the character string entered by the user, where a character string that includes characters passing through a path from the root node to the target node in the trie matches the character string entered by the user, and the at least one word is output as a recommended hot word based on the one or more words stored in the target node. A completed hot word is output to the user only when the target node stores the hot word, output is performed based on the one or more words stored in the target node, and a hot word that meets a prefix condition does not need to be searched for based on the character string entered by the user. Therefore, hot word completion efficiency can be improved, and the completed hot word presented to the user can better meet a user requirement.

In a possible embodiment of the first aspect, the at least one word stored in the first node is prefixed with the character string that includes the characters passing through the path from the root node to the first node.

In the word completion method provided in this embodiment of this application, all stored hot words are hot words prefixed with the character string that includes the characters passing through the path from the root node to the first node. This conforms to query logic of the trie, and there is higher search efficiency.

In a possible embodiment of the first aspect, the trie includes a plurality of second nodes, and the second node stores no word.

In the word completion method provided in this embodiment of this application, the trie further includes the plurality of second nodes that store no hot word. When the character string entered by the user matches the second node, no hot word is output to the user, to improve user experience.

In a possible embodiment of the first aspect, the character string includes a first character to an $N^{th}$ character arranged in an input order of the user; and the searching a trie for a target node that matches the character string, includes: searching the trie based on the input order, where a character string that includes the first character to an $(N-1)^{th}$ character entered by the user matches a second node in the trie.

In the word completion method provided in this embodiment of this application, in a process of entering, by the user, the characters one by one based on an order of the character, when the first character is entered, a matched node is a second node that stores no hot word, and therefore no recommended hot word is output. Similarly, when the $(N-1)^{th}$ character is entered, a node that matches the character string that includes the first character to the $(N-1)^{th}$ character is still a second node that stores no hot word, and therefore no recommended hot word is output. After the $N^{th}$ character is entered, a first node, namely, the target node described above, that stores a word is matched. Therefore, it may be learned that when the user enters a relatively short character string, no recommended hot word is output. In this way, interference to the user can be avoided and user experience can be improved.

In a possible embodiment of the first aspect, the character string includes a first character to an $N^{th}$ character arranged in an input order of the user, a character string that includes the first character to an (N−1)$^{th}$ character entered by the user matches a first node in the trie, and one or more words stored in the first node are the same as or different from the one or more words stored in the target node.

In a possible embodiment of the first aspect, the first node further stores a completion probability corresponding to each word prefixed with the character string that includes the characters passing through the path from the root node to the first node, and the completion probability corresponding to each word indicates a probability of outputting the word when the first node is matched. Optionally, a completion probability of a word is a percentage of a word frequency of the word in a sum of word frequencies of all words prefixed with the character string that includes the characters passing through the path from the root node to the first node in a database. Optionally, the first node stores a plurality of hot words, and the plurality of hot words are arranged in descending order of completion probabilities.

In the word completion method provided in this embodiment of this application, the first node further stores the completion probability of each hot word. Therefore, an order of the at least one word recommended to the user may be determined based on the completion probability of the word, so that the user quickly obtains a word with a relatively high completion probability, to improve user experience.

In a possible embodiment of the first aspect, the first node stores at least one piece of data of a key-value structure, the key-value structure includes a key and a value associated with the key, the key is a word prefixed he character string that includes the characters passing through the path from the root node to the first node, and the value is a completion probability of the word.

In the word completion method provided in this embodiment of this application, the first node stores one or more pieces of data of the key-value structure. This is a convenient and clear storage manner. Each word corresponds to a word completion probability, and a plurality of words may be conveniently sorted.

In a possible embodiment of the first aspect, an order of the at least one output word is related to an arrangement order of the one or more words stored in the target node.

In the word completion method provided in this embodiment of this application, the one or more words stored in the target node may be arranged in a plurality of orders. Optionally, sorting is performed based on an order of letters at a same character location in different hot words. Optionally, sorting is performed based on an order of Chinese phonetic letters at a same character location in different hot words. Alternatively, sorting is performed based on a word frequency of the hot word. The order of the at least one output word may be the same as the order of the one or more words stored in the target node. Therefore, a time required for hot word recommendation can be reduced, and hot word recommendation efficiency can be improved.

In a possible embodiment of the first aspect, words stored in the plurality of first nodes are from point of information POI data or user log data.

In the word completion method provided in this embodiment of this application, the hot words stored in the first nodes may be from various existing hot word databases, for example, the POI data or the user log data. Different databases may be specifically selected based on an actual application scenario. For example, in a map application, a hot word from the POI data may be considered for use.

According to a second aspect of the embodiments of this application, a word completion method is provided, and includes: obtaining a character string entered by a user; and searching a trie for a target node that matches the character string, to output at least one word, where the trie includes a plurality of first nodes, the target node is one of the plurality of first nodes, each first node stores at least one word that includes a character string corresponding to the first node, and one or more words stored in the target node include the at least one output word.

A difference from the first aspect of the embodiments of this application lies in that in this embodiment of this application, a node in the trie has a different storage manner, and a character string corresponding to each node is one more character than that corresponding to a previous node, and includes a character string corresponding to any node on a path from a root node to the node. In this case, the first node stores the at least one word that includes the character string corresponding to the first node. Parts other than the storage manner in the trie are similar to those in the first aspect of the embodiments of this application. Details are not described herein.

According to a third aspect of the embodiments of this application, a word completion method is provided, and includes: obtaining a character string entered by a user; searching a first trie constructed based on a first word database for a target node that matches the character string, to output a first word set, where the first word set includes at least one word, the first trie includes a plurality of first nodes, the target node is one of the plurality of first nodes, each first node stores at least one word that includes a character string that includes characters passing through a path from a root node to the first node, and one or more words stored in the target node include a word in the first word set; outputting, based on a second word database, a second word set prefixed with the character string; and outputting, based on the first word set and the second word set, at least one word recommended to the user. Optionally, the target node stores the at least one word prefixed with the character string that includes the characters passing through the path from the root node to the first node.

In the method provided in this embodiment of this application, a hot word may be recommended to the user with reference to hot word sources of at least two hot word databases. A hot word is stored in the node in the first trie constructed based on the first word database, and the stored hot word includes a character passing through a path from the root node to the node. The hot word stored in the node is a word with a relatively high completion probability. In other words, a hot word prefixed with an excessively short character string usually has a relatively low completion probability, and therefore is not stored in the node in the trie. The completed first word set is output to the user only when the target node stores the hot word. Therefore, a case in which hot word completion is triggered in a scenario in which there is a non-obvious intention, for example, a scenario in which the user enters a relatively short character string, or in a scenario in which there is a relatively low hot word completion probability can be avoided. In addition, the hot word is output to the user with reference to the first word set and the second word set, and therefore hot word recommendation accuracy can be improved.

In a possible embodiment of the third aspect, the first word set includes at least two words arranged in an ordered manner; the second word set includes at least two words arranged in an ordered manner; and a target word set includes a word ranked first in the first word set and a word ranked first in the second word set.

In the method provided in this embodiment of this application, the output hot word recommended to the user includes the hot word ranked first in the first hot word set and the hot word ranked first in the second hot word set. In comparison with the conventional technology, there is a higher probability that the recommended hot word matches an intention of the user. Therefore, hot word recommendation accuracy can be improved.

In a possible embodiment of the third aspect, the outputting, based on the first word set and the second word set, at least one word recommended to the user includes: determining a completion probability of each word in a union set of the first word set and the second word set based on a preset first weight of the first word set and a preset second weight of the second word set; and determining, based on the completion probability, the at least one word recommended to the user.

In the method provided in this embodiment of this application, recommendation weights may be set for hot word databases of different data sources based on an actual application scenario of hot word recommendation, for example, a type of an application that performs recommendation, to calculate the completion probability of each word in the union set of the first word set and the second word set. Therefore, hot word recommendation accuracy can be improved.

In a possible embodiment of the third aspect, the outputting, based on a second word database, a second word set prefixed with the character string includes: obtaining the second word set based on a trie constructed based on a user log word database; inputting the character string to a machine learning algorithm trained based on a user log word database, to output the second word set; or obtaining the second word set based on a hash tree constructed based on a user log word database.

Optionally, a data source of the first word database is a POI database, and a data source of the second word database is a user log database.

In the method provided in this embodiment of this application, the second word set may be obtained by using a plurality of existing hot word completion methods. In addition, a completion result based on POI data and a completion result based on log data are combined, and therefore timeliness of a completed hot word and a correlation with a POI can be ensured.

According to a fourth aspect of the embodiments of this application, a method for constructing a trie is provided, and includes: constructing a trie based on a word database, where the trie includes a plurality of first nodes, and each first node stores at least one word that includes a character string that includes characters passing through a path from a root node to the first node; and deleting a word stored in the node, to retain a word whose completion probability is greater than or equal to a first threshold in each node, where the completion probability indicates a probability of outputting the word when the node is matched.

In the method for constructing a trie provided in this embodiment of this application, a method for constructing an efficient trie structure is provided, and an improvement is made on the basis of a conventional trie. Specifically, a hot word is stored in the node in the trie, and the stored hot word includes a character passing through a path from the root node to the node. The hot word stored in the node is a word whose completion probability is greater than or equal to the first threshold. In other words, a hot word prefixed with an excessively short character string usually has a relatively low completion probability, and therefore is not stored in the node in the trie. A target node that matches a character string entered by a user is searched for based on the improved trie, and at least one word is output as a recommended hot word based on one or more words stored in the target node. A completed hot word is output to the user only when the target node stores the hot word, output is performed based on the one or more words stored in the target node, and a hot word that meets a prefix condition does not need to be searched for based on the character string entered by the user. Therefore, hot word completion efficiency can be improved. In addition, a case in which hot word completion is triggered in a scenario in which there is a non-obvious intention, for example, a scenario in which the user enters a relatively short character string, or in a scenario in which there is a relatively low hot word completion probability can be avoided.

In a possible embodiment of the fourth aspect, the completion probability is a percentage of a word frequency of the word in a sum of word frequencies of all words prefixed he character string that includes the characters passing through the path from the root node to the first node.

In a possible embodiment of the fourth aspect, the first threshold is a preset value, and a value range is [0.1, 0.2]. By properly setting the first threshold, it can be ensured that a hot word is recommended to the user on a proper occasion. Under a same condition, a larger first threshold indicates a longer character string that triggers hot word recommendation and a higher probability that a recommended hot word matches an intention of the user. However, if there is an excessively large first threshold, the user can obtain the recommended hot word only after waiting for a relatively long time (or when entering a relatively large quantity of characters), which is not conducive to improving user experience. Therefore, a value of the first threshold needs to be properly set based on an actual hot word completion scenario, may be preset, or may be adjusted based on an application scenario or a user requirement.

In a possible embodiment of the fourth aspect, the node in the trie stores data of a key-value structure, the key-value structure includes a key and a value associated with the key, the key is a word prefixed with the characters from the root node to the node, the value is a completion probability of the word, and the completion probability of the word is a percentage of a word frequency of the word in a sum of word frequencies of all words prefixed he character string that includes the characters passing through the path from the root node to the first node.

In a possible embodiment of the fourth aspect, the method further includes: arranging, in descending order of completion probabilities, one or more words stored in the node in the trie.

According to a fifth aspect of the embodiments of this application, a word completion apparatus is provided, and includes: an obtaining unit, configured to obtain a character string entered by a user; and an output unit, configured to search a trie for a target node that matches the character string, to output at least one word. The trie includes a plurality of first nodes, the target node is one of the plurality of first nodes, and each first node stores one or more words. The one or more words include a character string that includes characters passing through a path from a root node to the first node in which the one or more words are located in the trie tree. One or more words stored in the target node include the at least one output word.

In a possible embodiment of the fifth aspect, the one or more words are prefixed with the character string that includes the characters passing through the path from the root node to the first node in which the one or more words are located in the trie tree.

In a possible embodiment of the fifth aspect, the trie includes a plurality of second nodes, and each second node stores no word.

In a possible embodiment of the fifth aspect, the character string includes a first character to an $N^{th}$ character arranged in an input order of the user; and the output unit is specifically configured to search the trie based on the input order. A character string that includes the first character to an $(N-1)^{th}$ character entered by the user matches a second node in the trie.

In a possible embodiment of the fifth aspect, the first node further stores a completion probability corresponding to each of the one or more words, and the completion probability corresponding to each word indicates a probability of outputting the word when the first node is matched.

In a possible embodiment of the fifth aspect, the first node stores at least one piece of data of a key-value structure, the key-value structure includes a key and a value associated with the key, the key is a word prefixed with the character string that includes the characters passing through the path from the root node to the first node, the value is a completion probability of the word, and the completion probability indicates a probability of outputting the key when the first node is matched.

In a possible embodiment of the fifth aspect, an order of the at least one output word is related to an arrangement order of the one or more words stored in the target node.

In a possible embodiment of the fifth aspect, words stored in the plurality of first nodes are from point of information POI data or user log data.

According to a sixth aspect of the embodiments of this application, a word completion apparatus is provided. A difference from the word completion apparatus in the fifth aspect of the embodiments of this application lies in that a node in a trie has a different storage manner, and a character string corresponding to each node is one more character than that corresponding to a previous node, and includes a character string corresponding to any node on a path from a root node to the node. In this case, a first node stores at least one word that includes a character string corresponding to the first node. Parts other than the storage manner in the trie are similar to those in the fifth aspect of the embodiments of this application. Details are not described herein.

According to a seventh aspect of the embodiments of this application, a word completion apparatus is provided, and includes: an obtaining unit, configured to obtain a character string entered by a user; and an output unit, configured to search a trie for a target node that matches the character string, to output a first word set. The first word set includes at least one word. The first trie includes a plurality of first nodes, the target node is one of the plurality of first nodes, and each first node stores at least one word that includes a character string that includes characters passing through a path from a root node to the first node in the trie. One or more words stored in the target node include a word in the first word set. Words stored in the plurality of first nodes are from a first word database. The output unit is further configured to output, based on a second word database, a second word set prefixed with the character string. The output unit is further configured to output, based on the first word set and the second word set, at least one word recommended to the user.

In a possible embodiment of the seventh aspect, the first word set includes at least two words arranged in an ordered manner; the second word set includes at least two words arranged in an ordered manner; and a target word set includes a word ranked first in the first word set and a word ranked first in the second word set.

In a possible embodiment of the seventh aspect, the output unit is specifically configured to output, based on a probability of outputting each word in a union set of the first word set and the second word set, the at least one word recommended to the user. The probability of outputting each word in the union set is determined based on a preset first weight of the first word set and a preset second weight of the second word set.

In a possible embodiment of the seventh aspect, the output unit is specifically configured to: obtain the second word set based on a trie constructed based on a user log word database; input the character string to a machine learning algorithm trained based on a user log word database, to output the second word set; or obtain the second word set based on a hash tree constructed based on a user log word database.

According to an eighth aspect of the embodiments of this application, an apparatus for constructing a trie is provided, and includes: a construction unit, configured to construct a trie based on a word database, where the trie includes a plurality of first nodes, and each first node stores at least one word that includes a character string that includes characters passing through a path from a root node to the first node; and a deletion unit, configured to delete a word stored in the node, to retain a word whose completion probability is greater than or equal to a first threshold in each node. The completion probability indicates a probability of outputting the word when the node is matched.

In a possible embodiment of the eighth aspect, the completion probability is a percentage of a word frequency of the word in a sum of word frequencies of all words prefixed he character string that includes the characters passing through the path from the root node to the first node.

In a possible embodiment of the eighth aspect, the first threshold is a preset value, and a value range is [0.1, 0.2].

In a possible embodiment of the eighth aspect, the node in the trie stores data of a key-value structure, the key-value structure includes a key and a value associated with the key, the key is a word prefixed with the characters from the root node to the node, the value is a completion probability of the word, and the completion probability of the word is a percentage of a word frequency of the word in a sum of word frequencies of all words prefixed he character string that includes the characters passing through the path from the root node to the first node.

In a possible embodiment of the eighth aspect, one or more words stored in the node in the trie are arranged in descending order of completion probabilities.

According to a ninth aspect of the embodiments of this application, a terminal is provided, and includes one or more processors and a memory. The memory stores computer-readable instructions; and the one or more processors read the computer-readable instructions, so that the terminal performs the method according to any one of the first aspect to the fourth aspect and the possible embodiments.

According to a tenth aspect of the embodiments of this application, a server is provided, and includes one or more processors and a memory. The memory stores computer-readable instructions; and the one or more processors read the computer-readable instructions, so that the server performs the method according to any one of the first aspect to the fourth aspect and the possible embodiments.

According to an eleventh aspect of the embodiments of this application, a computer program product including instructions is provided. When the computer program product is run on a computer, the computer is enabled to perform the method according to any one of the first aspect to the fourth aspect and the possible embodiments.

According to a twelfth aspect of the embodiments of this application, a computer-readable storage medium is provided, and includes instructions. When the instructions are run on a computer, the computer is enabled to perform the method according to any one of the first aspect to the fourth aspect and the possible embodiments.

According to a thirteenth aspect of the embodiments of this application, a chip is provided, and includes a processor. The processor is configured to read and execute a computer program stored in a memory, to perform the method according to any one of the first aspect to the fourth aspect and the possible embodiments. Optionally, the chip includes the memory, and the memory is connected to the processor by using a circuit or a wire. Further, optionally, the chip further includes a communication interface, and the processor is connected to the communication interface. The communication interface is configured to receive data and/or information that need/needs to be processed. The processor obtains the data and/or the information from the communication interface, processes the data and/or the information, and outputs a processing result by using the communication interface. The communication interface may be an input/output interface.

For technical effects brought by any embodiment of the fifth aspect to the twelfth aspect, refer to the technical effects brought by the corresponding embodiment of the first aspect to the fourth aspect. Details are not described herein.

It can be learned from the foregoing technical solutions that embodiments of this application have the following advantages:

In the hot word completion method provided in this application, word completion is performed based on the improved trie. The improved trie includes the plurality of first nodes that store words. The improved trie is searched for the target node that matches the character string entered by the user, and the at least one word is output as a recommended hot word based on the one or more words stored in the target node. A completed hot word is output to the user only when the target node stores the hot word, output is performed based on the one or more words stored in the target node, and a hot word that meets a prefix condition does not need to be searched for based on the character string entered by the user. Therefore, hot word completion efficiency can be improved.

In addition, in this solution, filtering is performed by using the completion probability of the hot word. In comparison with a solution in which a shortest trigger length is strictly set to limit a hot word completion occasion, in this solution, the completion probability of the hot word prefixed with the character string corresponding to the node is counted. Therefore, a completion trigger length of each hot word can be specifically determined, which better meets an actual completion requirement. A case in which hot word completion is triggered in a scenario in which there is a non-obvious intention, for example, a scenario in which the user enters a relatively short character string, or in a scenario in which there is a relatively low hot word completion probability can be avoided. Search performed by using a hot word prefixed with an excessively short character string is avoided, and therefore completion efficiency can be effectively improved in this solution.

In addition, in this solution, output is performed based on a completion result based on the first word database and a completion result based on the second word database, for example, a completion result based on POI data and a completion result based on log data are combined, and therefore timeliness of a completed hot word and a correlation with a POI can be ensured.

DESCRIPTION OF EMBODIMENTS

Figure 1:
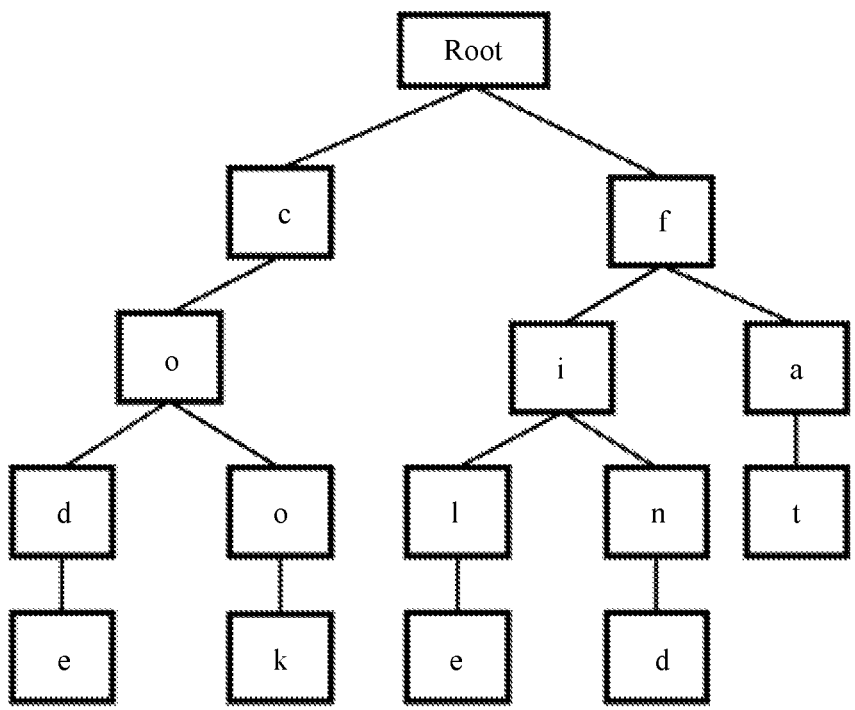
FIG. 1 is a schematic diagram of an example of a basic trie tree structure.

Embodiments of this application provide a word completion method, to improve word completion efficiency and avoid a case in which a word is recommended to a user when the user enters an excessively short character string.

For ease of understanding, some technical terms in the embodiments of this application are briefly described below.

1. Word

This application relates to word completion. A meaning of the "word" is first briefly described herein.

The word completion method provided in this application is applied to the search field. Specifically, when a user enters characters one by one in a search bar area, a complete word is recommended to the user by predicting a search word expected by the user. Therefore, the user does not need to enter a complete word by entering characters one by one, but may directly choose from the recommended word. Therefore, search efficiency of the user can be improved, and user experience can be improved. Usually, a data source of the word recommended to the user includes historical data such as a user log. A word that is as much as possible similar to the word expected by the user is recommended through statistics collection and filtering and with reference to an incomplete character entered by the user. Based on this technical background, it may be understood that the "word" in the embodiments of this application is a concept in a broad sense. Based on a search language of the user, the "word" includes words in different languages. Based on a data source of the word, the word may include a single word or a phrase that includes a plurality of words. Description is provided below by using a Chinese word and an English word as examples.

(1) "超市" is a Chinese word, and "超市" is a "word" in this application, and includes two characters.

(2) Although "农业银行" includes two words "农业" and "银行", "农业银行" as a whole is a search word commonly used by the user if "农业银行" is based on a data source such as a user log. Therefore, "农业银行" is also a "word" in this application, and includes four characters.

(3) "Starbucks" is an English word, is a "word" in this application, and includes nine characters.

(4) Based on an understanding in a narrow sense, "burger king" includes two English words "burger" and "king". However, "burger king" as a whole is a search word commonly used by the user, and therefore "burger king" is also a "word" in this application. It should be noted that in this application, "burger king" is considered as a whole, and "burger king" includes 11 characters, in other words, a space between "burger" and "king" also occupies one character.

The "word" recommended to the user may be obtained through statistics collection and filtering by using a database of words from a source such as a user log. The word recommended to the user is usually a hot search word with a relatively high word frequency in the database, and therefore is usually referred to as a "hot word" in the technical field, namely, a "word" in the embodiments of this application. A word frequency source of the word is not limited in this application. In addition, a data source of the word may be a hot word database commonly used in the conventional technology. This is also not limited in this application. In the following embodiments, description is provided by using a "hot word".

2. POI

The POI is short for "point of information", and may be translated into "信息点" in Chinese. In a geographic information system, the POI may be a house, a shop, a postbox, a bus stop, or the like.

In the embodiments of this application, the POI refers to a location name on a map, for example, "Huangjinshan Park", "Illy Coffee", "Xin World Apartment", or "China Post".

A POI hot word is obtained through filtering based on POI data. For example, a word frequency of each word in the POI data is counted, and a specific proportion of words with a highest word frequency are selected as POI hot words.

3. Character String

Query text entered by a user in a search bar is usually an incomplete word, may include one or more characters, and is collectively referred to as a character string in the embodiments of this application.

4. Trie

The trie is also referred to as a search tree or a prefix tree, and is also referred to as a trie tree in the embodiments. The trie tree is typically applied to counting, sorting, and storing a large quantity of character strings, and therefore is usually used in a search engine system to count a text word frequency. An advantage of the trie tree is that a common prefix of character strings is used to reduce a query time and minimize unnecessary comparisons between character strings.

A common solution of completing an incomplete prefix is that a trie tree is constructed for all candidate words, and the trie tree is searched for a character string, to improve query efficiency.

FIG. 1 is a schematic diagram of an example of a basic trie tree structure. It is assumed that there are five character strings: "code", "cook", "file", "fat", and "find", and a trie tree structure constructed for the character strings is shown in FIG. 1. A method for searching, by using a trie tree, for a node that matches a character string is as follows: Starting from a root node, a node that stores a character the same as a first character in the character string is first determined, then a child node of the node is searched for a node the same as a second character in the character string, and so on. A child node of a node is a lower node directly connected to the node. Child nodes of the node correspond to different characters.

A prefix-matched character string is searched for by using the trie tree, and therefore unnecessary comparisons between character strings can be reduced, and a common prefix is used to improve query efficiency. For example, when "code" and "cook" have a common prefix "co", there is no need to compare the common prefix "co" for two times. In actual application of the trie tree, a word frequency is usually additionally stored in a node corresponding to each candidate word, and the word frequency is used as a basis for sorting candidate words with a common prefix.

The embodiments of this application are described below with reference to the accompanying drawings. Apparently, the described embodiments are merely some but not all of the embodiments of this application. A person of ordinary skill in the art may know that with technical development and emergence of a new scenario, the technical solutions provided in the embodiments of this application are also applicable to a similar technical problem.

In the specification, claims, and accompanying drawings of this application, the terms "first", "second", and so on are intended to distinguish between similar objects but do not necessarily indicate a specific order or sequence. It should be understood that the data termed in such a way are interchangeable in proper circumstances so that embodiments described herein can be implemented in other orders than the order illustrated or described herein. Moreover, the terms "include", "contain" and any other variants mean to cover the non-exclusive inclusion, for example, a process, method, system, product, or device that includes a list of operations or modules is not necessarily limited to those operations or modules, but may include other operations or modules not expressly listed or inherent to such a process, method, system, product, or device. Names or numbers of operations in this application do not mean that the operations in the method procedure need to be performed in a time/logical sequence indicated by the names or numbers. An execution sequence of the operations in the procedure that have been named or numbered can be changed based on a technical objective to be achieved, provided that same or similar technical effects can be achieved.

Figure 2A:
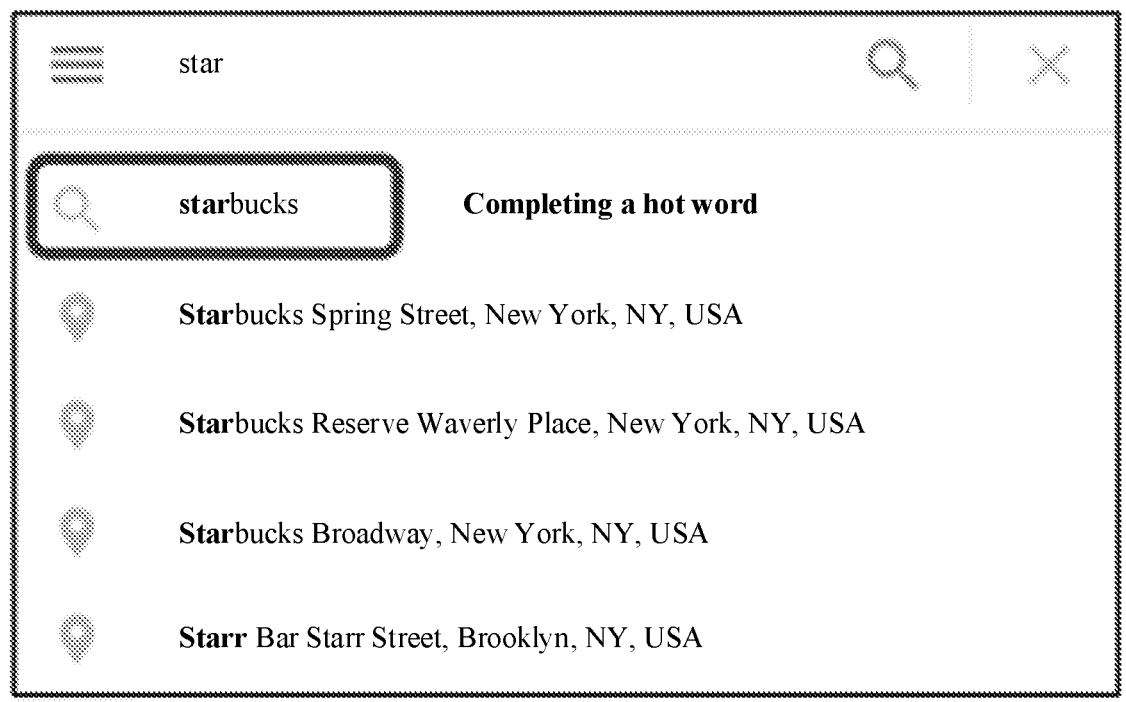
FIG. 2a is a schematic diagram of a hot word completion interface.

As shown in FIG. 2a, when a user enters "star", a server or a terminal recommends a hot word "starbucks" to the user. The user may tap the hot word, and then perform POI search by using the hot word, to obtain a more comprehensive and detailed search result list. It should be noted that a completed hot word is usually a word such as a type or a brand name, for example, a "hotel" or "starbucks", and does not refer to a specific location, for example, "Oriental Pearl".

In the conventional technology, when the user enters an incomplete character string, prefix matching is usually performed on the character string entered by the user in all hot words, to enumerate all hot words that meet prefix matching, the hot words that meet prefix matching are subsequently sorted in descending order of search popularity or correlations between the character string and the hot words, and top N results are selected as hot words finally recommended to the user. This method is very concise and effective in an incomplete text completion scenario. However, in actual application, this method has the following technical problems: There are usually an excessively large quantity of hot words that meet prefix matching, especially when there is a relatively short character string, and there is relatively low search efficiency. It is difficult to determine completion trigger occasions of different hot words. When the user enters an excessively short character string, for example, when there are only one or two letters, a search intention of the user is not clear, and there are an excessively large quantity of hot words that meet prefix matching. In this case, if a hot search word is recommended to the user, user experience may be affected, and a non-hot word search scenario may be interfered with. For example, in a map scenario, when one or two letters are entered, a surrounding important administrative area is usually returned.

To resolve the foregoing problem in a hot word completion technology, a trie tree structure is constructed in the present invention, and because of a special structure of a C-trie, conditional filtering and sorting can be performed on hot words, and additional storage can be performed. Therefore, hot word completion performance is greatly improved.

In addition, a completion result based on POI data and a completion result based on a search log are combined, and therefore timeliness of a completed hot word and a correlation with the POI data can be ensured.

Figure 2B:
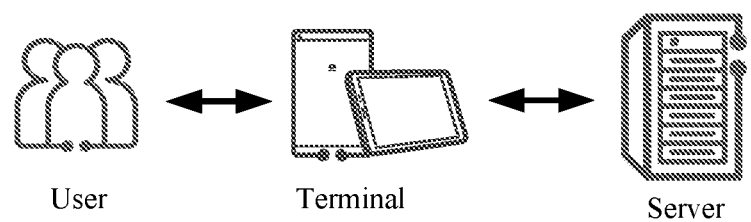
FIG. 2b is a schematic diagram of a system architecture of a hot word completion method according to an embodiment of this application.

A system architecture of the method in this application is briefly described below. FIG. 2b is a schematic diagram of a system architecture of a hot word completion method according to an embodiment of this application.

The system architecture includes a user, a terminal, and a server. The terminal and the server are communicatively connected to each other by using various communication links.

Usually, the user enters a character string by using an input module of the terminal for search, and the terminal locally performs search based on an input from the user, and outputs a recommended hot word to the user by using a display module of the terminal.

Alternatively, the terminal sends a request entered by the user to the server, the server performs hot word completion based on a character string entered by the user, and sends an output hot word to the terminal, and the terminal receives the hot word sent by the server, and outputs the hot word to the user by using an output module.

It may be learned that the hot word completion method provided in this embodiment of this application may be performed by the terminal or a network device such as the server. This is not specifically limited.

In the hot word completion method in this application, a conventional trie tree is improved, and only hot words that meet a condition are stored in some nodes in the trie tree. Therefore, in this embodiment of this application, the improved trie tree is referred to as a conditional trie, and is briefly referred to as a C-trie tree. It may be understood that a trie tree is the improved trie tree in this embodiment of this application provided that some nodes in the trie tree store hot words that meet a specific condition. A name of the improved trie tree is not limited in this application.

In an embodiment, in the C-trie tree, a data structure of a Key-Value (K-V) structure is added to some nodes in a common trie tree. A key is a hot word prefixed with a character string represented by a node. For example, the character string represented by the node is "酒", and a key in data of the K-V structure stored in the node is "酒店". A value is a percentage of a word frequency of the hot word (namely, a hot word corresponding to the key) in a sum of word frequencies of all hot words prefixed with the character string represented by the node, namely, a probability that the hot word is completed, and is referred to as a "completion probability" in this embodiment of this application. For example, if there are a total of two words "酒店" and "酒吧" prefixed with "酒", a word frequency of "酒店" is 70, and a word frequency of "酒吧" is 30, a value corresponding to the key "酒店" is 70%. Optionally, data of the K-V structure in each node is sorted in descending order of values. Certainly, hot words and completion probabilities may be stored in some nodes in the C-trie tree by using another form of data format, for example, a mapping table or a linked list. This is not limited in this application.

A method for constructing a C-trie tree is described below.

Operation 1: Construct a common trie tree based on a hot word database.

Figure 3A:
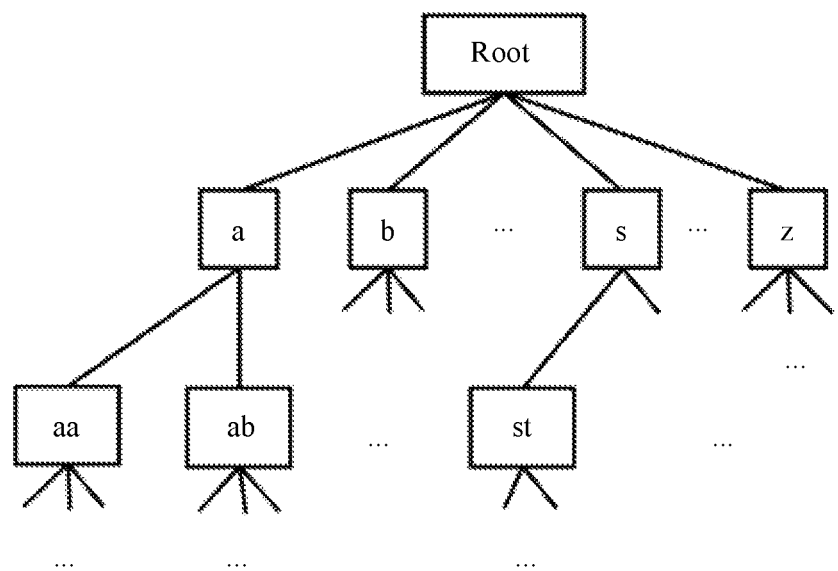
FIG. 3a is a schematic diagram of an embodiment of constructing a C-trie tree according to an embodiment of this application.

Optionally, referring to FIG. 3a, for ease of understanding, in the figure, a character string represented by each node is displayed in the node, and includes all characters obtained by connecting characters passing through a path from a root node to the node. Alternatively, each node may directly represent a character string shown in FIG. 3a. The hot word database may be an existing hot word database of any source, for example, a common hot word database such as a user log-based hot word database or a POI hot word database. This is not specifically limited herein.

Operation 2: Store hot words in a plurality of nodes in the trie tree.

One or more hot words stored in each node include at least one word that includes a character string that includes characters passing through a path from the root node to the node. Optionally, the one or more hot words stored in each node include at least one word prefixed with the character string that includes the characters passing through the path from the root node to the node. A source of the word may be the hot word database for constructing the trie tree in operation 1, or may be another hot word database of a source different from that of the hot word database for constructing the trie tree in operation 1.

It should be noted that a trie tree structure is a data structure in which hot words are stored based on a same prefix. Therefore, for each node, all words prefixed with the character string that includes the characters passing through the path from the root node to the node may be obtained one by one by querying child nodes of the node, in other words, all the words prefixed with the characters passing through the path from the root node to the node may be obtained from the trie tree structure. However, in this embodiment, the storing a hot word in a node does not mean obtaining the hot word by querying the trie tree, but means directly storing the hot word in the node. In a process of using the solution, after a target node is obtained, a hot word stored in the target node may be directly obtained, and no query needs to be performed by using the trie tree structure.

Optionally, each node further stores a completion probability corresponding to the hot word, and the completion probability indicates a probability of outputting the hot word when the node is matched.

Optionally, the hot word stored in the node is data of a K-V structure, and each node may store one or more pieces of data of the K-V structure. A key is a hot word prefixed with a character string represented by the node, and a value is a completion probability of the hot word. Optionally, the completion probability is a percentage of a word frequency of the hot word in a sum of word frequencies of all hot words prefixed with the character string represented by the node. Alternatively, in all hot words prefixed with the node, a percentage of a word frequency of the hot word in a sum of word frequencies of all the hot words is the value corresponding to the hot word, namely, the completion probability of the hot word. The completion probability is a percentage of a word frequency of the hot word prefixed with the characters from the root node to the node in a sum of word frequencies of all hot words prefixed with the characters from the root node to the node.

Figure 3B:
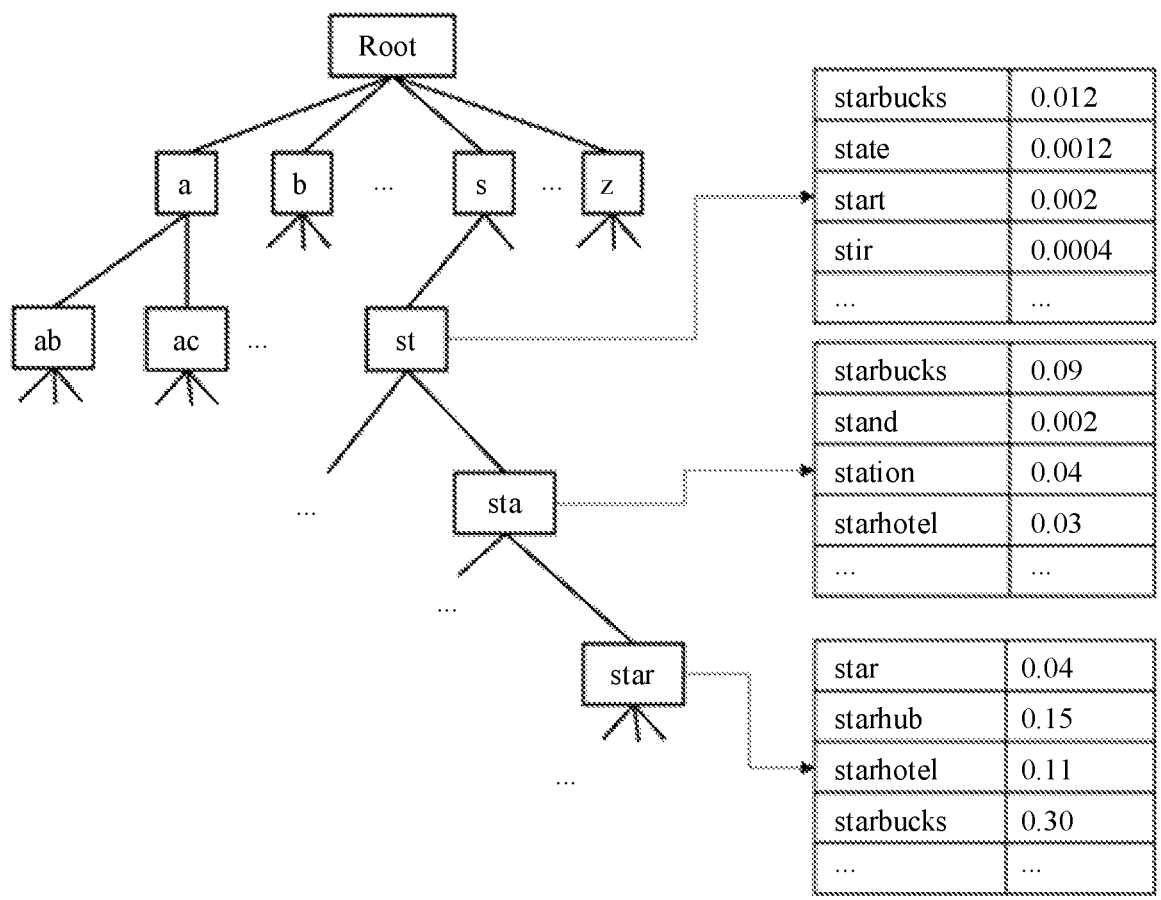
FIG. 3b is a schematic diagram of hot word data stored in a node in a C-trie tree according to an embodiment of this application.

For example, as shown in FIG. 3b, hot words prefixed with "st" include "starbucks", "state", "start", and "stir", and these hot words are used as keys to calculate a completion probability of the hot word. A completion probability of "starbucks" is 0.012, a completion probability of "state" is 0.0012, a completion probability of "start" is 0.002, and a completion probability of "stir" is 0.0004.

Similarly, hot word data of the K-V structure is added to each node in the trie tree.

It should be noted that operation 1 and operation 2 may be synchronously performed, that is, when each node in the trie tree is constructed, one or more hot words are stored in each node.

Operation 3: Delete a hot word stored in each node.

The hot word stored in each node is deleted based on a first threshold. Optionally, the data of the K-V structure is deleted.

Figure 3C:
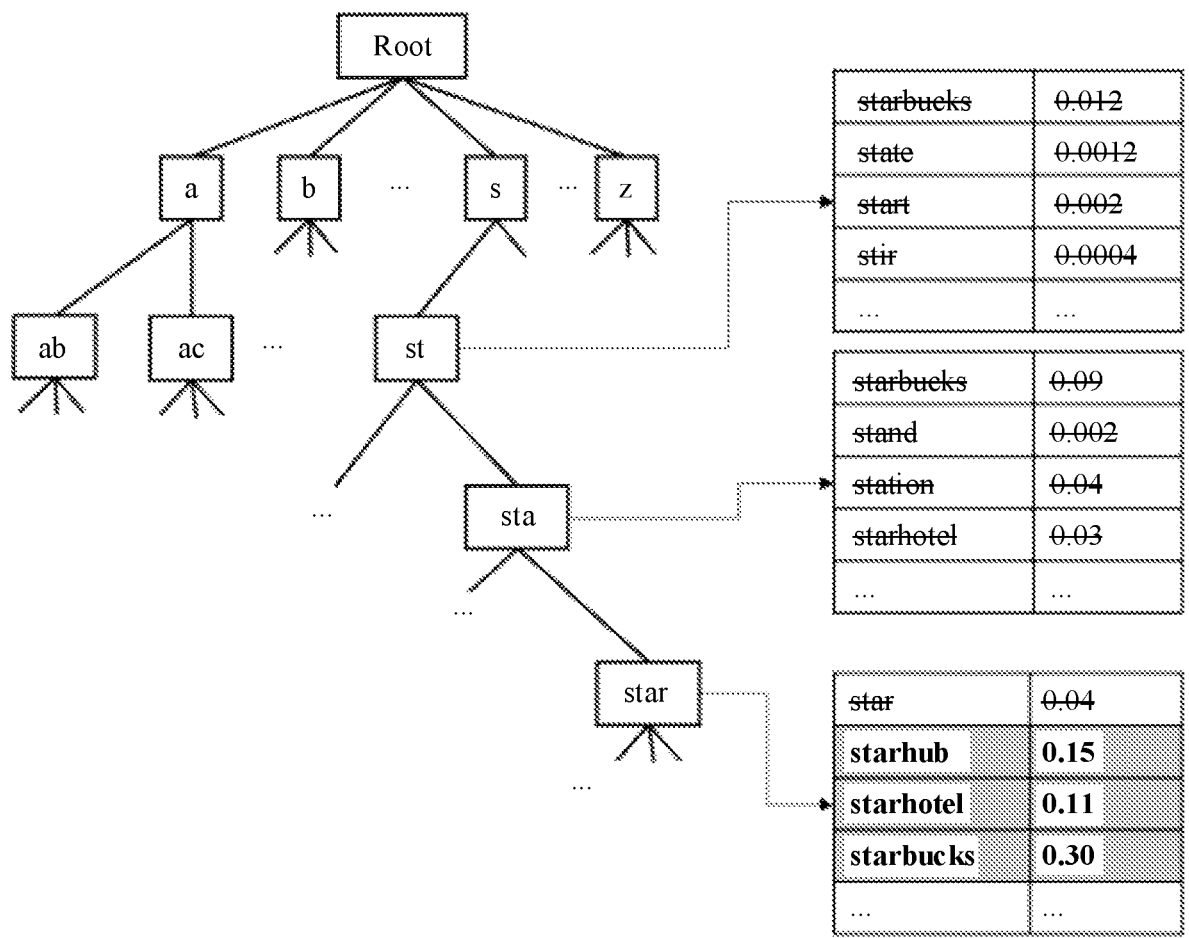
FIG. 3c is a schematic diagram of deleting stored hot word data in a node in a C-trie tree according to an embodiment of this application.

Optionally, if a value in a specific piece of data of the K-V structure stored in the node is less than the specified first threshold, the K-V structure is deleted. As shown in FIG. 3c, it is assumed that the first threshold is 0.1. In this case, none of probabilities of all candidate hot words in nodes "st" and "sta" meets a threshold condition, and all the candidate hot words are deleted. It should be noted that the first threshold is a value that falls within an interval (0, 1), and a specific value is not limited. For example, a value range of the first threshold is [0.1, 0.2]. For example, the first threshold may be 0.1, 0.12, 0.15, 0.18, or 0.2. It may be understood that by properly setting the first threshold, it can be ensured that a hot word is recommended to a user on a proper occasion. Under a same condition, a larger first threshold indicates a longer character string that triggers hot word recommendation and a higher probability that a recommended hot word matches an intention of the user. However, if there is an excessively large first threshold, the user can obtain the recommended hot word only after waiting for a relatively long time (or when entering a relatively large quantity of characters), which is not conducive to improving user experience. Therefore, a value of the first threshold needs to be properly set based on an actual hot word completion scenario, may be preset, or may be adjusted based on an application scenario or a user requirement.

It should be noted that operation 1, operation 2, and operation 3 may be synchronously performed, that is, when each node in the trie tree is constructed, one or more hot words are stored in each node, and a hot word is deleted.

Operation 4: Sort the one or more hot words stored in the node.

The one or more hot words stored in the node may be arranged in an ordered manner. A sorting rule is not limited herein. For example, for English hot words, sorting is performed based on an order of first letters, is performed based on an order of second letters when the first letters are the same, and so on. Chinese hot words are sorted in an order of Chinese phonetic letters of characters, or sorted based on a word frequency of the hot word.

Figure 3D:
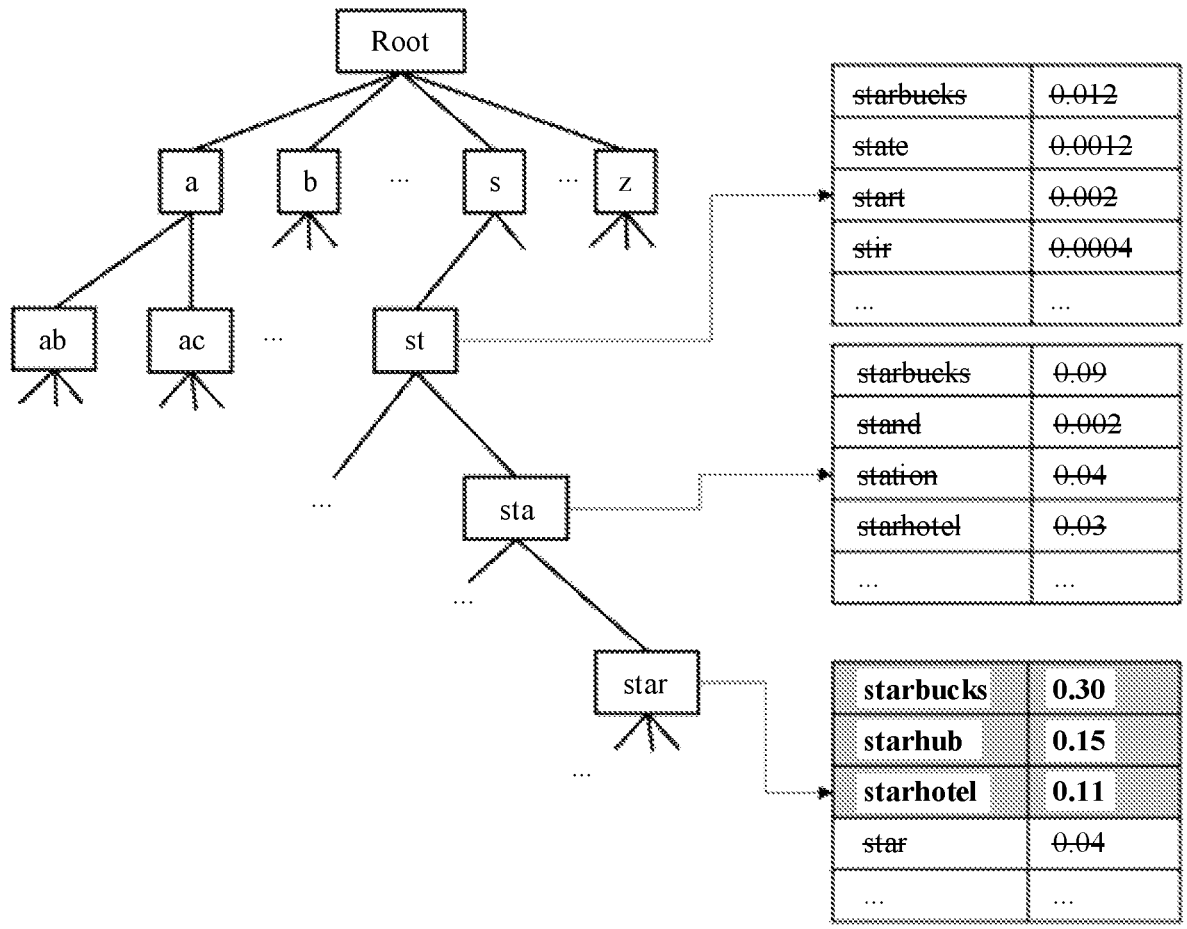
FIG. 3d is another schematic diagram of hot word data stored in a node in a C-trie tree according to an embodiment of this application.

Optionally, remaining hot word data of the K-V structure that is not deleted in each node is sorted in descending order of values. As shown in FIG. 3d, hot words stored in a node "star" are arranged in descending order of completion probabilities.

It should be noted that operation 4 is an optional operation, and may be or may not be performed.

It may be understood that an execution order of operation 4 and operation 3 is not limited.

Based on the foregoing operations, the C-trie tree in this embodiment of this application is constructed. It may be learned that main features of the C-trie tree are as follows:

(1) Anode may not be associated with data of the K-V structure, or associated with one or more pieces of data of the K-V structure.

(2) Each piece of data of the K-V structure is used to indicate a probability that a hot word prefixed with a character string represented by the node is completed.

(3) The completion probability of the hot word indicated in the data of the K-V structure stored in the node is greater than or equal to the first threshold.

(4) Data of the K-V structure stored in a node is arranged in descending order of completion probabilities of hot words.

In another possible embodiment, some nodes that store no hot word may be deleted from the C-trie tree. Details are not described herein.

Some nodes in the C-trie tree store words, and therefore the improved C-trie tree is searched for a target node that matches a character string entered by the user, and at least one word is output to the user as a recommended hot word based on one or more words stored in the target node. A completed hot word is output to the user only when the target node that stores the hot word is matched, output is performed based on the one or more words stored in the target node, and a hot word that meets a prefix condition does not need to be searched for based on the character string entered by the user. Therefore, hot word completion efficiency can be improved.

Figure 4:
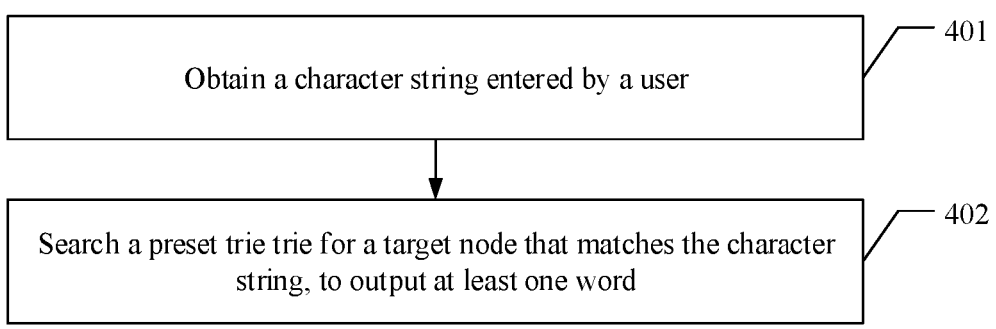
FIG. 4 is a schematic diagram of an embodiment of a word completion method according to an embodiment of this application.

FIG. 4 is a schematic diagram of an embodiment of a hot word completion method according to an embodiment of this application.

401. Obtain a character string entered by a user.

A server or a terminal obtains search text entered by the user. The user needs to enter characters one by one, and therefore the search text is usually an incomplete character string. On an appropriate occasion, a prefix is intelligently completed based on the character string entered by the user. Therefore, input duration of the user can be reduced, and user experience can be improved.

402. Search a preset trie for a target node that matches the character string, to output at least one word.

The output hot word is to be recommended to the user. The user may select a word that meets an expectation of the user from the at least one output word, and does not need to enter a complete word. In a scenario in which the user has difficulty in spelling or partially forgets a word that the user expects to enter, assistance is provided, thereby improving user experience.

A character string obtained by sequentially connecting characters passing through a path from a root node to a node is a character string corresponding to the node. The trie tree in this embodiment of this application is the C-trie tree described in the foregoing embodiment. It may be learned from the method for constructing a C-trie tree that a character string represented by a node in the C-trie tree is the same as that in a conventional trie tree, and is a character string obtained by sequentially connecting characters passing through a path from the root node to the node. A difference lies in that some nodes in the C-trie tree store hot words. For ease of description, a node that stores a hot word may be referred to as a first node, and the C-trie tree includes a plurality of first nodes. Optionally, a hot word stored in the first node in the C-trie tree includes a character string obtained by sequentially connecting characters passing through a path from the root node to the first node. For example, if the character string obtained by sequentially connecting the characters passing through the path from the root node to the first node is "rea", the hot word stored in the first node includes a word prefixed with "rea", for example, read, or may include a word that includes "rea", for example, entreat. Optionally, the hot word stored in the first node in the C-trie tree is a hot word prefixed with the character string obtained by sequentially connecting the characters passing through the path from the root node to the node. For example, if the character string obtained by sequentially connecting the characters passing through the path from the root node to the first node is "rea", the hot word stored in the first node is ready, rear, or really.

Optionally, the node in the C-trie tree stores data of a key-value (K-V) structure, where K is a hot word prefixed with a character string represented by the node, and V is a completion probability of the hot word, namely, a percentage of a word frequency of the hot word in a sum of word frequencies of all hot words prefixed with the character string represented by the node. The completion probability indicates a probability of outputting the hot word when the first node is matched. It may be learned, based on a construction process of the C-trie tree, that a completion probability of a retained hot word is greater than or equal to a first threshold, in other words, a hot word whose completion probability is less than the first threshold is deleted. Optionally, all of a plurality of hot words prefixed with a character string corresponding to a node correspond to completion probabilities that are less than the first threshold, and therefore some nodes in the C-trie tree may not be associated with data of the K-V structure. This case is common in a scenario in which the node corresponds to an excessively short character string. Optionally, in a plurality of hot words prefixed with a character string corresponding to a node, some hot words correspond to completion probabilities that are less than the first threshold and are deleted, and some hot words correspond to completion probabilities that are greater than or equal to the first threshold and are retained. Therefore, the node stores some hot words, and is a first node. Optionally, all of a plurality of hot words prefixed with a character string corresponding to a node correspond to completion probabilities that are greater than or equal to the first threshold, and all of the hot words are retained. Therefore, the node stores the hot words, and is a first node. For ease of description, a node that stores no hot word is referred to as a second node, and the C-trie tree includes a plurality of second nodes.

One first node in the C-trie tree may be associated with one piece of data of the K-V structure, and there is only one hot word prefixed with a character corresponding to the node, or there is only one hot word whose completion probability is greater than or equal to the first threshold. Alternatively, one first node in the C-trie tree may be associated with a plurality of pieces of data of the K-V structure. A specific quantity of pieces of data of the K-V structure is not limited, or deletion may be performed based on a completion probability, and data of the K-V structure corresponding to a preset quantity of hot words with a relatively high completion probability is retained.

Optionally, hot word databases of different sources may be used to construct the C-trie tree in this embodiment of this application. For example, the hot word database may be a user log hot word database, and a log hot word is a hot search word obtained through filtering by using log data. Alternatively, the hot word database may be a POI hot word database, and POI hot words are a specific proportion of words with a highest word frequency, and are obtained by counting a word frequency of each word in map POI data.

The server or the terminal searches the C-trie tree based on the character string, and may determine the target node that matches the character string, in other words, a character string represented by the target node is consistent with the character string.

If the target node stores hot word data, at least one hot word prefixed with the character string is output based on the stored hot word data.

If the target node stores hot word data, the at least one hot word is output as a recommended hot word based on the stored hot word. A quantity of recommended hot words is usually limited, and may be preset by the server, or may be set based on a user requirement. A specific quantity of recommended hot words is not limited. If the specified quantity of recommended hot words is less than a quantity of hot words stored in the target node, the output hot word is some of all hot words stored in the target node.

The one or more hot words stored in the node may be arranged in an ordered manner. A sorting rule is not limited herein. For example, for English hot words, sorting is performed based on an order of first letters, is performed based on an order of second letters when the first letters are the same, and so on. Chinese hot words are sorted in an order of Chinese phonetic letters of characters, or sorted based on a word frequency of the hot word. Optionally, remaining hot word data of the K-V structure that is not deleted in each node is sorted in descending order of values. As shown in FIG. 3d, hot words stored in a node "star" are arranged in descending order of completion probabilities.

Optionally, an order of the at least one output word is related to an arrangement order of one or more hot words stored in the target node. For example, top N hot words are directly output based on the arrangement order of the one or more hot words stored in the target node, where N is a preset quantity of recommended hot words.

Figure 5:
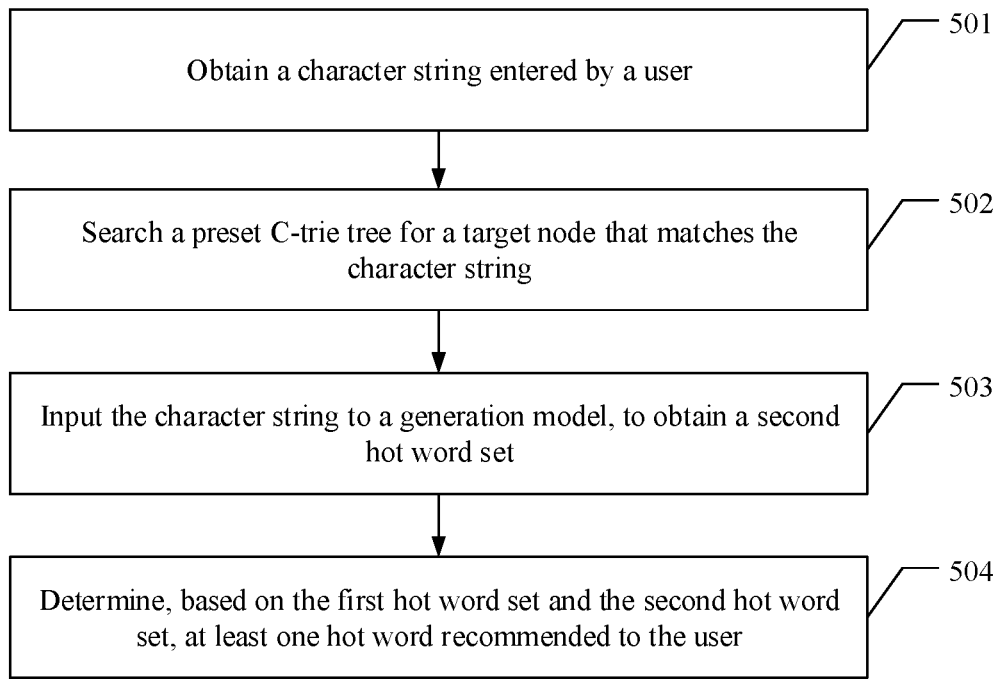
FIG. 5 is a schematic diagram of another embodiment of a word completion method according to an embodiment of this application.

In the hot word completion method provided in this embodiment of this application, a hot word may be recommended to the user by using the improved trie tree and with reference to an existing hot word completion method. This is described below in detail. FIG. 5 is a schematic diagram of another embodiment of a hot word completion method according to an embodiment of this application.

501. Obtain a character string entered by a user.

Either a server or a terminal may be used as an execution body of the solution. Description is provided below by using an example in which the server implements the solution. The server obtains search text entered by the user. The user needs to enter characters one by one, and therefore the search text is usually an incomplete character string. On an appropriate occasion, a prefix is intelligently completed based on the character string entered by the user. Therefore, input duration of the user can be reduced, and user experience can be improved.

502. Search a preset C-trie tree for a target node that matches the character string, to output a first hot word set.

The server may search the pre-constructed C-trie tree based on the character string, to determine the target node that matches the character string. A character string obtained by sequentially connecting characters passing through a path from a root node to a node is a character string corresponding to the node. A character string corresponding to the target node that matches the character string is the same as the character string entered by the user.

The C-trie tree in this embodiment is constructed based on a POI hot word database. For a specific process of constructing the C-trie tree, refer to the foregoing embodiment. Details are not described herein.

If the target node stores hot word data, the first hot word set prefixed with the character string is output based on the hot word data.

If the target node stores hot word data, a hot word that is stored in the database and that is prefixed with the character string may be output. Optionally, N hot words with a highest completion probability are selected from the hot word data stored in the target node.

The N output hot words are the first hot word set. N is an integer greater than or equal to 1, and N is a preset value. A specific value is not limited herein. Optionally, for example, N is 3. It may be understood that if a quantity of hot words prefixed with the character string is less than N, all hot words may be output as hot words in the first hot word set.

For example, "st" is used. When the user enters "st", no K-V structure is stored in a corresponding node. In this case, no hot word completion is triggered. When the user enters "star", a K-V structure is stored in a corresponding node, and top N hot word results are obtained based on a completion probability. If N=3, a hot word completion result, namely, the first hot word set, in the C-trie tree is starbucks, starhub, and starhotel.

503. Input the character string to a generation model, to obtain a second hot word set.

The second hot word set prefixed with the character string is output based on a user log hot word database, and the second hot word set includes at least one hot word.

There are a plurality of manners of outputting, based on the user log hot word database, the second hot word set prefixed with the character string.

Optionally, a user log hot word trie is constructed based on the user log hot word database, to perform hot word completion, so as to obtain the second hot word set.

Optionally, the character string is input to a machine learning algorithm trained based on the user log hot word database, to output the second hot word set. The machine learning algorithm includes a recurrent neural network (RNN), a long short-term memory (LSTM), a gated recurrent unit (GRU), a support vector machine (SVM), or the like. A specific algorithm is not limited herein. In this embodiment of this application, the machine learning algorithm is also referred to as a generation model or a prediction model.

Optionally, a user log hot word hash tree is constructed based on the user log hot word database, to perform hot word completion, so as to obtain the second hot word set.

A solution of performing hot word completion based on the user log hot word database by using the machine learning algorithm is described below.

If a hot word completion condition is met, a hot word result is predicted by using the prediction model for the character string entered by the user, and top N results are selected as the second hot word set.

Figure 6:
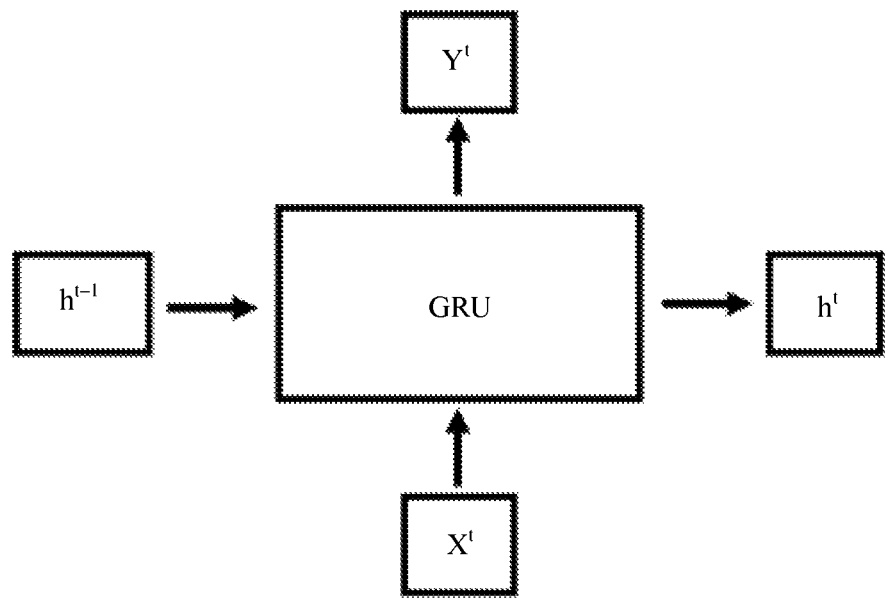
FIG. 6 is a schematic diagram of an input/output structure of a prediction model according to an embodiment of this application.

For example, the prediction model used in this embodiment is a GRU. An internal structure and a principle of the GRU are not described in detail, and a rough input/output structure of the GRU is shown in FIG. 6. The time series model GRU has an input character $X^t$ at a current moment and a hidden state $h^{t-1}$ transferred from a previous moment. The hidden state includes related information of a previous node. With reference to $X^t$ and $h^{t-1}$, the GRU obtains an output $y^t$ at the current moment and a hidden state $h^t$ to be transferred to a next moment. There is an end when an output y is a terminator. By analogy, a character string obtained by splicing the character string entered by the user with a character string that includes all predicted characters y is a finally predicted hot word result.

For example, star is used as an input to the model, and each column represents an input and an output at a moment. In this case, predicted top three results are starbucks, starhub, and starstreet, and completion probabilities are respectively 0.77, 0.15, and 0.08.

It should be noted that the machine learning algorithm deployed in the server may train a user log hot word in an online learning manner, to reflect a change of user log data in real time and ensure timeliness of a completed hot word.

504. Determine, based on the first hot word set and the second hot word set, at least one hot word recommended to the user.

The server determines, based on the first hot word set and the second hot word set, the at least one hot word finally recommended to the user, and sends the at least one hot word to the terminal, and the terminal displays the recommended hot word to the user by using a display device. Alternatively, the terminal determines, based on the first hot word set and the second hot word set, the at least one hot word recommended to the user, and displays the at least one hot word to the user.

The server may combine and re-sort results with relatively high confidence based on hot word candidate result sets provided based on the two hot word sets, and recommend top N hot word results.

Optionally, the at least one finally recommended hot word may be a hot word in the first hot word set; may be a hot word in the second hot word set; or may include a hot word in the first hot word set and a hot word in the second hot word set. This is not specifically limited herein.

Optionally, top one hot words are first respectively selected from a POI hot word completion candidate set and a log hot word completion candidate set based on the two candidate result sets, and are added to a hot word completion result set, and de-duplication is performed on the two top one hot words, to obtain K hot words (K=1 or 2). Then, weighted summation and sorting are performed on remaining (2N−2) candidate results, a weight is adjusted based on a service scenario, and top (N−K) results are selected and added to the hot word completion result set. Finally, the hot word completion result set is re-sorted to obtain a final hot word completion result.

For example, 1. The top one hot words respectively selected from the POI hot word completion candidate set and the log hot word completion candidate set are respectively "starbucks" and "starbucks", and after de-duplication, one hot word "starbucks" is obtained and added to the result set.

2. Weighted summation and sorting are performed on the remaining results, it is set that a weight of POI hot word completion is 3 and a weight of log hot word completion is 1, and top (3-1) results "starhub" and "starhotel" are selected and added to the result set.

A result obtained after weighted summation and sorting are performed on the remaining results is shown in Table 1:

TABLE 1

| Starhub | 0.60 |
|---|---|
| Starhotel | 0.33 |
| Starstreet | 0.08 |

3. The completion result set is re-sorted, and it is obtained that the final hot word completion result is "starbucks", "starhub", and "starhotel".

In this embodiment of this application, the C-trie tree is constructed based on POI data, conditional filtering is performed on hot words with a common prefix, to filter out a hot word with an excessively low probability and reduce a quantity of candidate hot words with the prefix, and the candidate hot words are stored in an ordered manner. In comparison with an existing technology in which hot word completion starts to be performed when the user enters a first letter, in the solution in this embodiment of this application, whether hot word completion is triggered is determined based on the C-trie tree. A case in which hot word completion is triggered when the user enters an excessively short word or when a search intention is not clear, and consequently interference is caused to non-hot word search logic can be avoided, and problems that hot word completion is triggered when there is an excessively short input and there is low hot word completion efficiency can be resolved. Therefore, hot word completion performance can be effectively improved.

In addition, if only a user search log is considered in a hot word completion method, a correlation between a completed hot word and the POI data cannot be ensured, and there may be a case in which no result is returned when POI search is performed by using the hot word. In the hot word completion method provided in this embodiment of this application, the POI hot word database and the user log hot word database are comprehensively considered. Therefore, a correlation between the recommended hot word and the POI data can be improved, and cases in which no result is returned when POI search is performed based on the recommended hot word can be reduced.

Figure 7:
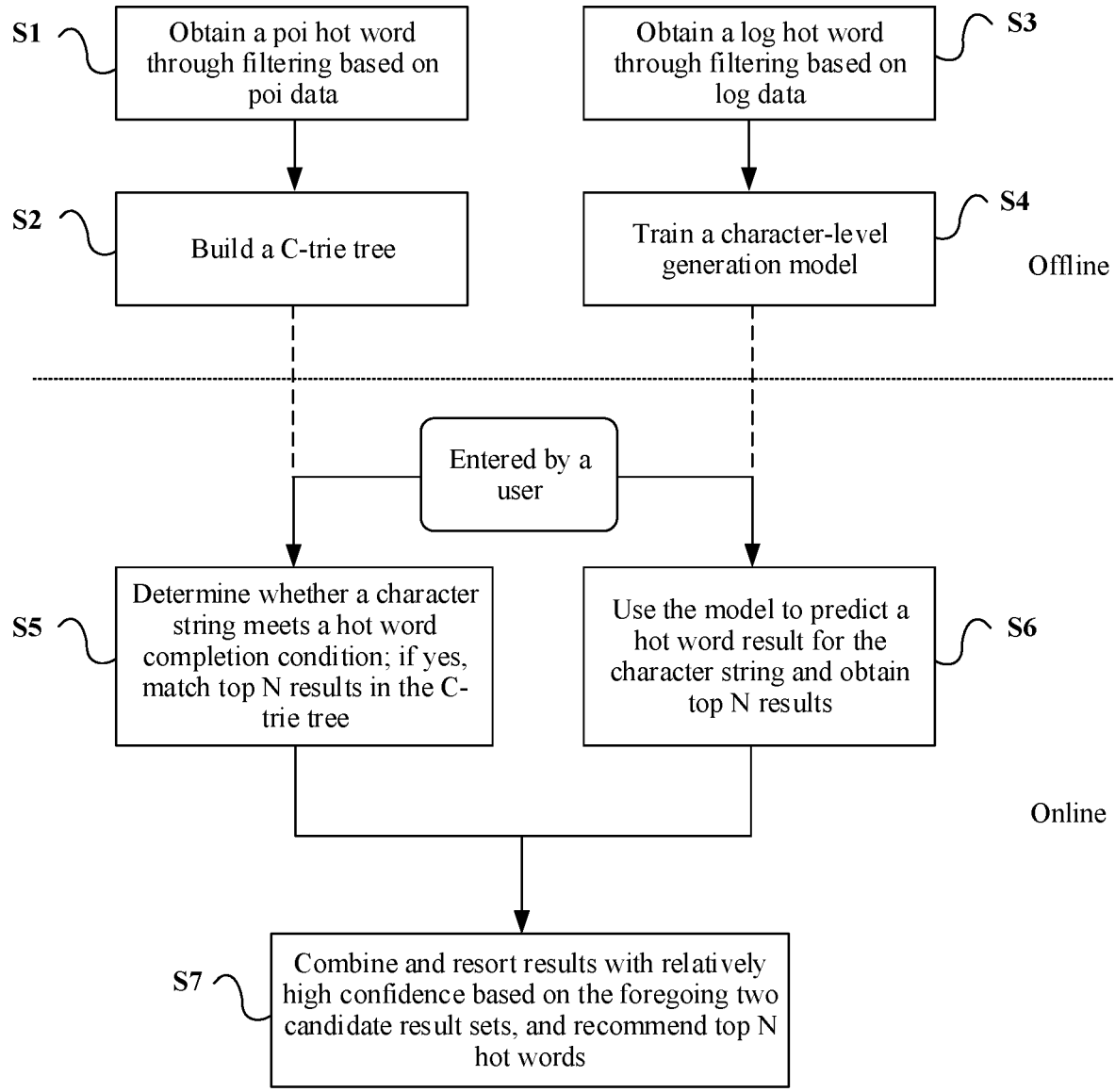
FIG. 7 is a schematic diagram of another embodiment of a word completion method according to an embodiment of this application.

FIG. 7 is a schematic diagram of another embodiment of a hot word completion method according to an embodiment of this application.

S1: Obtain a POI hot word through filtering based on POI data. A word frequency of each word in the POI data is counted, and a specific proportion of words with a highest word frequency are selected as POI hot words.

S2: Construct a C-trie tree based on the POI hot word obtained through filtering. For a specific process of constructing the C-trie tree, refer to the foregoing embodiment. Details are not described herein.

S3: Obtain a log hot word through filtering based on log data. A word frequency of each search word in the log data is counted, and a specific proportion of words with a highest word frequency are selected as log hot words.

S4: Train a character-level generation model based on the log hot word obtained through filtering, to predict and complete an incomplete character string. The prediction model includes but is not limited to a common model such as an RNN or an LSTM. For the model, an input is an incomplete character string, and an output is a predicted complete hot word.

S5: Determine, in the C-trie tree for a character string entered by a user, whether a hot word completion condition is met. A determining basis is whether data of a K-V structure is stored in a corresponding node in the C-trie tree. If the corresponding node does not include the data of the K-V structure, no hot word completion is triggered. If the corresponding node includes the data of the K-V structure, hot word completion is triggered. When the hot word completion condition is met, top N results are selected in descending order of completion probabilities from the data of the K-V structure in the node corresponding to the character string, and are used as a hot word completion candidate set based on the POI data.

S6: When the hot word completion condition is met, predict a hot word result for an input from the user by using the character-level generation model trained based on the log data, and select top N results as a hot word completion candidate set based on the log data.

S7: First respectively select top one hot words from a POI hot word completion candidate set and a log hot word completion candidate set based on the two candidate result sets, add the top one hot words to a hot word completion result set, and perform de-duplication to obtain K hot words (K=1 or 2); then, perform weighted summation and sorting on remaining (2N−2K) candidate results, adjust a weight based on a service scenario, and select and add top (N-K) results to the hot word completion result set; and finally, re-sort the hot word completion result set to obtain a final hot word completion result.

Figure 8:
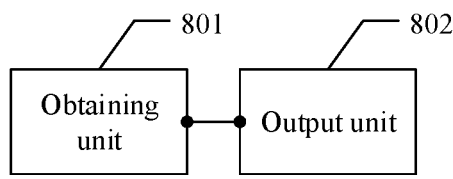
FIG. 8 is a schematic diagram of an embodiment of a word completion apparatus according to an embodiment of this application.

The word completion method provided in this application is described above. A word completion apparatus that implements the word completion method is described below. FIG. 8 is a schematic diagram of an embodiment of a word completion apparatus according to an embodiment of this application.

Only one or more of modules in FIG. 8 may be implemented by using software, hardware, firmware, or a combination thereof. The software or firmware includes but is not limited to computer program instructions or code, and may be executed by a hardware processor. The hardware includes but is not limited to various integrated circuits, for example, a central processing unit (CPU), a digital signal processor (DSP), a field programmable gate array (FPGA), or an application-specific integrated circuit (ASIC).

The word completion apparatus includes:
- an obtaining unit 801, configured to obtain a character string entered by a user; and
- an output unit 802, configured to search a trie for a target node that matches the character string, to output at least one word. The trie includes a plurality of first nodes, the target node is one of the plurality of first nodes, and each first node stores one or more words. The one or more words include a character string that includes characters passing through a path from a root node to the first node in which the one or more words are located in the trie tree. One or more words stored in the target node include the at least one output word.

Optionally, the one or more words are prefixed with the character string that includes the characters passing through the path from the root node to the first node in which the one or more words are located in the trie tree.

Optionally, the trie includes a plurality of second nodes, and each second node stores no word.

Optionally, the character string includes a first character to an $N^{th}$ character arranged in an input order of the user; and the output unit 802 is specifically configured to search the trie based on the input order. A character string that includes the first character to an $(N-1)^{th}$ character entered by the user matches a second node in the trie.

Optionally, the first node further stores a completion probability corresponding to each of the one or more words, and the completion probability corresponding to each word indicates a probability of outputting the word when the first node is matched.

Optionally, the first node stores at least one piece of data of a key-value structure, the key-value structure includes a key and a value associated with the key, the key is a word prefixed with the character string that includes the characters passing through the path from the root node to the first node, the value is a completion probability of the word, and the completion probability indicates a probability of outputting the key when the first node is matched.

Optionally, an order of the at least one output word is related to an arrangement order of the one or more words stored in the target node.

Optionally, words stored in the plurality of first nodes are from point of information POI data or user log data.

It should be noted that in another possible embodiment of the word completion apparatus, a node in a trie has a storage manner different from that of the node in this embodiment, and a character string corresponding to each node is one more character than that corresponding to a previous node, and includes a character string corresponding to any node on a path from a root node to the node. In this case, a first node stores at least one word that includes a character string corresponding to the first node. Parts other than the storage manner in the trie are similar to those in this embodiment of this application. Details are not described herein.

The word completion apparatus in this embodiment of this application may be configured to perform the word completion method provided in the foregoing embodiments. An improvement is made on the basis of a conventional trie, a hot word is stored in the node in the improved trie, and the stored hot word includes a character passing through a path from the root node to the node. The hot word stored in the node is a word with a relatively high completion probability. In other words, a hot word prefixed with an excessively short character string usually has a relatively low completion probability, and therefore is not stored in the node in the trie. In the word completion apparatus, the obtaining unit obtains the character string entered by the user, and the output unit searches the improved trie for the target node that matches the character string entered by the user, to output the at least one word as a recommended hot word. A completed hot word is output to the user only when the target node stores the hot word, output is performed based on the one or more words stored in the target node, and a hot word that meets a prefix condition does not need to be searched for based on the character string entered by the user. Therefore, in the word completion apparatus provided in this embodiment of this application, hot word completion efficiency can be improved, and the completed hot word presented to the user can better meet a user requirement.

Figure 9:
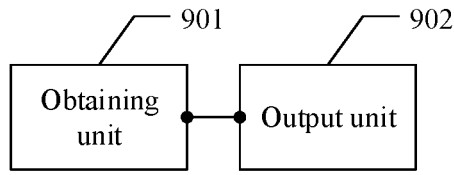
FIG. 9 is a schematic diagram of another embodiment of a word completion apparatus according to an embodiment of this application.

FIG. 9 is a schematic diagram of another embodiment of a word completion apparatus according to an embodiment of this application.

Only one or more of modules in FIG. 9 may be implemented by using software, hardware, firmware, or a combination thereof. The software or firmware includes but is not limited to computer program instructions or code, and may be executed by a hardware processor. The hardware includes but is not limited to various integrated circuits, for example, a central processing unit (CPU), a digital signal processor (DSP), a field programmable gate array (FPGA), or an application-specific integrated circuit (ASIC).

The word completion apparatus includes:
- an obtaining unit 901, configured to obtain a character string entered by a user; and
- an output unit 902, configured to search a trie for a target node that matches the character string, to output a first word set. The first word set includes at least one word. The first trie includes a plurality of first nodes, the target node is one of the plurality of first nodes, and each first node stores at least one word that includes a character string that includes characters passing through a path from a root node to the first node in the trie. One or more words stored in the target node include a word in the first word set. Words stored in the plurality of first nodes are from a first word database.

The output unit 902 is further configured to output, based on a second word database, a second word set prefixed with the character string.

The output unit 902 is further configured to output, based on the first word set and the second word set, at least one word recommended to the user.

Optionally, the first word set includes at least two words arranged in an ordered manner; the second word set includes at least two words arranged in an ordered manner; and a target word set includes a word ranked first in the first word set and a word ranked first in the second word set.

Optionally, the output unit 902 is specifically configured to output, based on a probability of outputting each word in a union set of the first word set and the second word set, the at least one word recommended to the user. The probability of outputting each word in the union set is determined based on a preset first weight of the first word set and a preset second weight of the second word set.

Optionally, the output unit 902 is specifically configured to: obtain the second word set based on a trie constructed based on a user log word database; input the character string to a machine learning algorithm trained based on a user log word database, to output the second word set; or obtain the second word set based on a hash tree constructed based on a user log word database.

The word completion apparatus in this embodiment of this application may be configured to perform the word completion method provided in the foregoing embodiments. A hot word is recommended to the user with reference to hot word sources of at least two hot word databases. A hot word is stored in the node in the first trie constructed based on the first word database, and the stored hot word includes a character passing through a path from the root node to the node. The hot word stored in the node is a word with a relatively high completion probability. In other words, a hot word prefixed with an excessively short character string usually has a relatively low completion probability, and therefore is not stored in the node in the trie. The completed first word set is output to the user only when the target node stores the hot word. Therefore, in the word completion apparatus provided in this embodiment of this application, a case in which hot word completion is triggered in a scenario in which there is a non-obvious intention, for example, a scenario in which the user enters a relatively short character string, or in a scenario in which there is a relatively low hot word completion probability can be avoided. In addition, the hot word is output to the user with reference to the first word set and the second word set, and therefore hot word recommendation accuracy can be improved.

Figure 10:
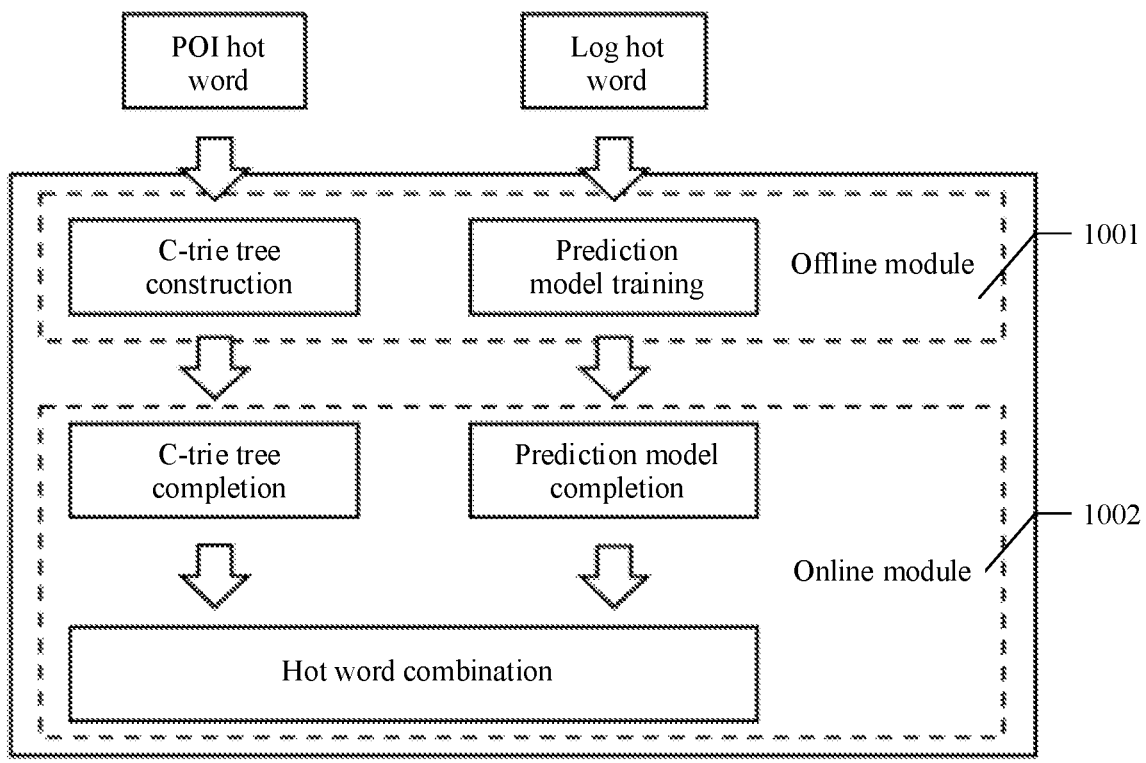
FIG. 10 is a schematic diagram of another embodiment of a word completion apparatus according to an embodiment of this application.

FIG. 10 is a schematic diagram of another embodiment of a word completion apparatus according to an embodiment of this application.

The completion apparatus may be implemented in a form of a software system. After the software system is deployed, a service is externally provided by using a remote interface. The word completion apparatus includes two modules: an offline module 1001 and an online module 1002.

A main task of the offline module 1001 is to process data of different data sources into a specific data structure or model.

The online module 1002 is mainly responsible for responding to a query request of a user.

Figure 11:
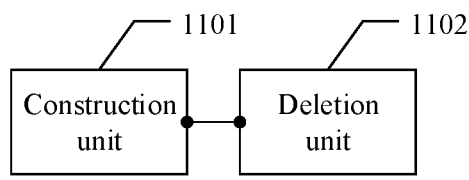
FIG. 11 is a schematic diagram of an embodiment of an apparatus for constructing a trie tree according to an embodiment of this application.

FIG. 11 is a schematic diagram of an embodiment of an apparatus for constructing a trie tree according to an embodiment of this application.

The apparatus for constructing a trie includes: a construction unit 1101, configured to construct a trie based on a word database, where the trie includes a plurality of first nodes, and each first node stores at least one word that includes a character string that includes characters passing through a path from a root node to the first node; and a deletion unit 1102, configured to delete a word stored in the node, to retain a word whose completion probability is greater than or equal to a first threshold in each node. The completion probability indicates a probability of outputting the word when the node is matched.

Optionally, the completion probability is a percentage of a word frequency of the word in a sum of word frequencies of all words prefixed he character string that includes the characters passing through the path from the root node to the first node.

Optionally, the first threshold is a preset value, and a value range is [0.1, 0.2].

Optionally, the node in the trie stores data of a key-value structure, the key-value structure includes a key and a value associated with the key, the key is a word prefixed with the characters from the root node to the node, the value is a completion probability of the word, and the completion probability of the word is a percentage of a word frequency of the word in a sum of word frequencies of all words prefixed he character string that includes the characters passing through the path from the root node to the first node.

One or more words stored in the node in the trie are arranged in descending order of completion probabilities.

The apparatus for constructing a trie provided in this embodiment of this application is configured to construct an improved trie tree, namely, a C-trie tree, provided in this embodiment of this application. An improvement is made on the basis of a conventional trie. Specifically, a hot word is stored in the node in the trie, and the stored hot word includes a character passing through a path from the root node to the node The hot word stored in the node is a word whose completion probability is greater than or equal to the first threshold. In other words, a hot word prefixed with an excessively short character string usually has a relatively low completion probability, and therefore is not stored in the node in the trie. A target node that matches a character string entered by a user is searched for based on the improved trie, and at least one word is output as a recommended hot word based on one or more words stored in the target node. A completed hot word is output to the user only when the target node stores the hot word, output is performed based on the one or more words stored in the target node, and a hot word that meets a prefix condition does not need to be searched for based on the character string entered by the user. Therefore, hot word completion efficiency can be improved. In addition, a case in which hot word completion is triggered in a scenario in which there is a non-obvious intention, for example, a scenario in which the user enters a relatively short character string, or in a scenario in which there is a relatively low hot word completion probability can be avoided.

Figure 12:
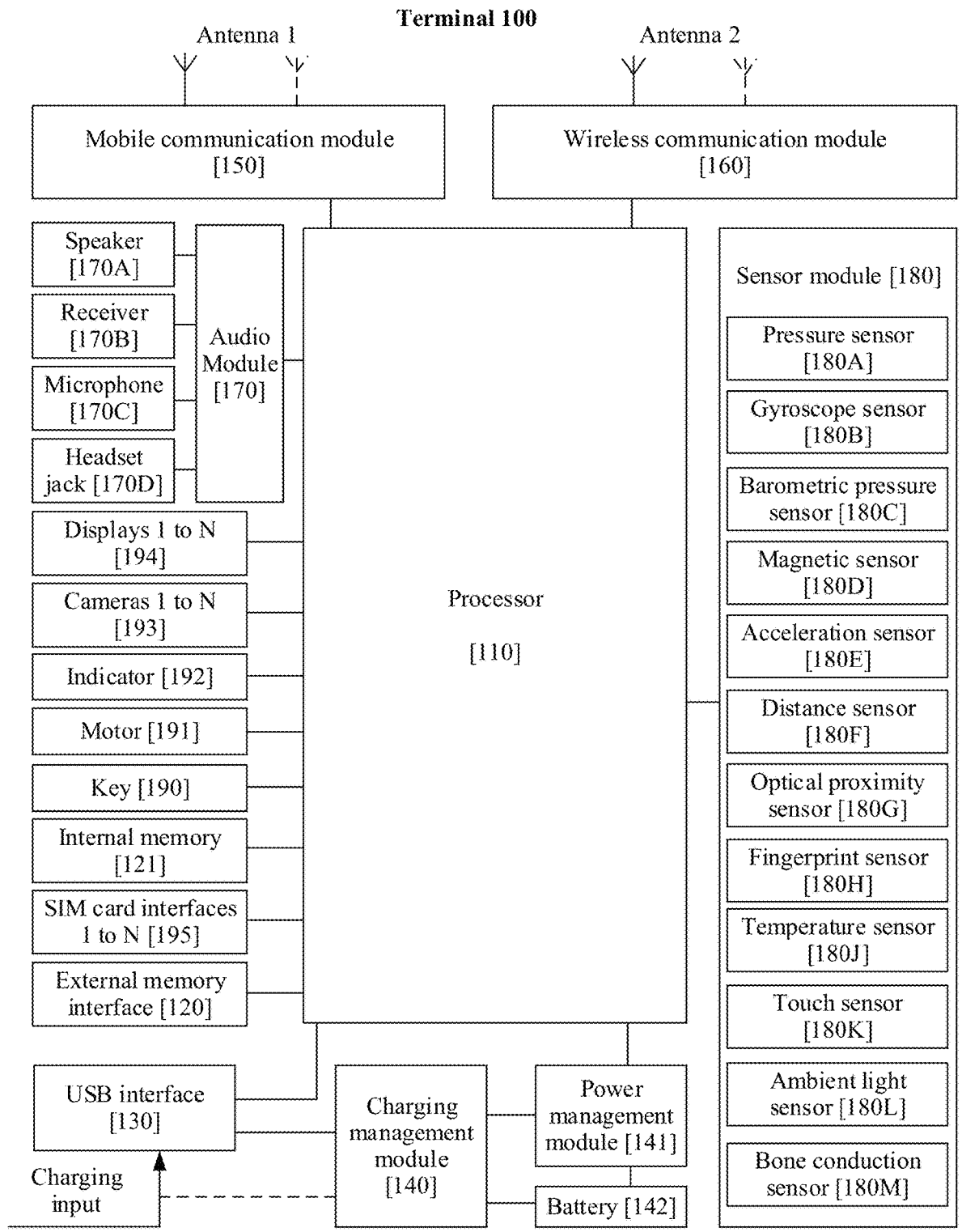
FIG. 12 is a schematic diagram of an embodiment of a terminal according to an embodiment of this application.

For ease of understanding, a structure of a terminal 100 provided in an embodiment of this application is described below by using an example. FIG. 12 is a schematic diagram of a structure of a terminal according to an embodiment of this application.

As shown in FIG. 12, the terminal 100 may include a processor 110, an external memory interface 120, an internal memory 121, a universal serial bus (universal serial bus, USB) interface 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a button 190, a motor 191, an indicator 192, a camera 193, a display screen 194, a subscriber identity module (subscriber identity module, SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the structure shown in this embodiment of this application does not constitute a specific limitation on the terminal 100. In some other embodiments of this application, the terminal 100 may include more or fewer components than those shown in the figure, or some components may be combined, or some components may be split, or there may be a different component layout. The components shown in the figure may be implemented by hardware, software, or a combination of software and hardware.

The processor 110 may include one or more processing units. For example, the processor 110 may include an application processor (AP), a modem processor, a graphics processing unit (GPU), an image signal processor (ISP), a controller, a memory, a video codec, a digital signal processor (DSP), a baseband processor, a neural-network processing unit (NPU), and/or the like. Different processing units may be independent components, or may be integrated into one or more processors.

The controller may be a nerve center and a command center of the terminal 100. The controller may generate an operation control signal based on an instruction operation code and a time sequence signal, to complete control of instruction reading and instruction execution. In this application, the controller may implement, based on instructions, the word completion method provided in the embodiments of this application.

A memory may be further disposed in the processor 110, and is configured to store instructions and data. In some embodiments, the memory in the processor 110 is a cache memory. The memory may store an instruction or data that has been used or cyclically used by the processor 110. If the processor 110 needs to use the instructions or the data again, the processor may directly invoke the instructions or the data from the memory. This avoids repeated access, reduces waiting time of the processor 110, and improves system efficiency. Optionally, the memory stores a pre-constructed trie tree.

In some embodiments, the processor 110 may include one or more interfaces. The interface may include an inter-integrated circuit (IIC) interface, an inter-integrated circuit sound (IIS) interface, a pulse code modulation (PCM) interface, a universal asynchronous receiver/transmitter (UART) interface, a mobile industry processor interface (MIPI), a general-purpose input/output (GPIO) interface, a subscriber identity module (SIM) interface, a universal serial bus (USB) port, and/or the like.

It may be understood that an interface connection relationship between the modules shown in this embodiment of this application is merely an example for description, and constitutes no limitation on the structure of the terminal 100. In some other embodiments of this application, the terminal 100 may alternatively use an interface connection manner different from that in the foregoing embodiment, or a combination of a plurality of interface connection manners.

The charging management module 140 is configured to receive a charging input from a charger. The charger may be a wireless charger or a wired charger. In some embodiments of wired charging, the charging management module 140 may receive a charging input of a wired charger through the USB interface 130.

The power management module 141 is configured to be connected to the battery 142, the charging management module 140, and the processor 110. The power management module 141 receives input of the battery 142 and/or the charging management module 140, to supply power to the processor 110, the internal memory 121, an external memory, the display screen 194, the camera 193, the wireless communication module 160, and the like.

A wireless communication function of the terminal 100 may be implemented by using the antenna 1, the antenna 2, the mobile communication module 150, the wireless communication module 160, the modem processor, the baseband processor, and the like.

In some feasible embodiments, the terminal 100 may communicate with another device by using the wireless communication function. For example, the terminal 100 may communicate with a second electronic device, the terminal 100 establishes a casting connection to the second electronic device, and the terminal 100 outputs casting data to the second electronic device. The casting data output by the terminal 100 may be audio/video data.

The antenna 1 and the antenna 2 are configured to transmit and receive an electromagnetic wave signal. Each antenna in the terminal 100 may be configured to cover a single communication band or a plurality of communication bands. Different antennas may be further multiplexed, to improve antenna utilization. For example, the antenna 1 may be multiplexed as a diversity antenna of a wireless local area network. In some other embodiments, the antenna may be used in combination with a tuning switch.

The mobile communication module 150 may provide a solution to wireless communication such as 1G/3G/4G/5G applied to the terminal 100. The mobile communication module 150 may include at least one filter, a switch, a power amplifier, a low noise amplifier (LNA), and the like. The mobile communication module 150 may receive an electromagnetic wave through the antenna 1, perform processing such as filtering or amplification on the received electromagnetic wave, and transmit the electromagnetic wave to the modem processor for demodulation. The mobile communication module 150 may further amplify a signal modulated by the modem processor, and convert the signal into an electromagnetic wave for radiation through the antenna 2. In some embodiments, at least some functional modules in the mobile communication module 150 may be disposed in the processor 110. In some embodiments, at least some functional modules of the mobile communication module 150 may be disposed in a same device as at least some modules of the processor 110. The terminal may communicate with a server by using the mobile communication module.

The modem processor may include a modulator and a demodulator. The modulator is configured to modulate a to-be-sent low-frequency baseband signal into a medium-high frequency signal. The demodulator is configured to demodulate a received electromagnetic wave signal into a low-frequency baseband signal. Then, the demodulator transmits the low-frequency baseband signal obtained through demodulation to the baseband processor for processing. The low-frequency baseband signal is processed by the baseband processor and then transmitted to the application processor. The application processor outputs a sound signal by an audio device (which is not limited to the speaker 170A, the receiver 170B, or the like), or displays an image or a video by the display screen 194. In some embodiments, the modem processor may be an independent component. In some other embodiments, the modem processor may be independent of the processor 110, and is disposed in a same device as the mobile communication module 150 or another functional module.

The wireless communication module 160 may provide a wireless communication solution that is applied to the terminal 100, and that includes a wireless local area network (WLAN) (for example, a wireless fidelity (Wi-Fi) network), Bluetooth (BT), a global navigation satellite system (GNSS), frequency modulation (FM), a near field communication (NFC) technology, an infrared (IR) technology, and the like. The wireless communication module 160 may be one or more components integrating at least one communication processor module. The wireless communication module 160 receives an electromagnetic wave by the antenna 1, performs frequency modulation and filtering processing on an electromagnetic wave signal, and sends a processed signal to the processor 110. The wireless communication module 160 may further receive a to-be-sent signal from the processor 110, perform frequency modulation and amplification on the signal, and convert the signal into an electromagnetic wave for radiation through the antenna 2.

In some embodiments, in the terminal 100, the antenna 1 and the mobile communication module 150 are coupled, and the antenna 2 and the wireless communication module 160 are coupled, so that the terminal 100 can communicate with a network and another device by using a wireless communication technology. The wireless communication technology may include a global system for mobile communications (GSM), a general packet radio service (GPRS), code division multiple access (CDMA), wideband code division multiple access (WCDMA), time-division code division multiple access (TD-SCDMA), long term evolution (LTE), BT, a GNSS, a WLAN, NFC, FM, an IR technology, and/or the like. The GNSS may include a global positioning system (gloGPS), a global navigation satellite system (GLONASS), a BeiDou navigation satellite system (BDS), a quasi-zenith satellite system (QZSS), and/or a satellite based augmentation system (SBAS).

The terminal 100 implements a display function by using the GPU, the display screen 194, the application processor, and the like. The GPU is a microprocessor for image processing, and is connected to the display screen 194 and the application processor. The GPU is configured to: perform mathematical and geometric computation, and render an image. The processor 110 may include one or more GPUs, which execute program instructions to generate or change display information.

The display screen 194 is configured to display an image, a video, and the like. The display screen 194 includes a display panel. The display panel may be a liquid crystal display (LCD), an organic light-emitting diode (OLED), an active-matrix organic light emitting diode (AMOLED), a flexible light-emitting diode (FLED), a mini-LED, a micro-LED, a micro-OLED, a quantum dot light emitting diode (QLED), or the like. In some embodiments, the terminal 100 may include one or N display screens 194, where N is a positive integer greater than 1. Specifically, the display screen 194 may display an output word to a user. A touch display screen may further obtain a character string entered by the user.

In some feasible embodiments, the display screen 194 may be configured to display various interfaces output by a system of the terminal 100. For the interfaces output by the terminal 100, refer to related description in subsequent embodiments.

The terminal 100 may implement an image shooting function by using the ISP, the camera 193, the video codec, the GPU, the display screen 194, the application processor, and the like.

The ISP is configured to process data fed back by the camera 193. For example, during photographing, a shutter is pressed, and light is transmitted to a photosensitive element of the camera through a lens. An optical signal is converted into an electrical signal, and the photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and a color temperature of a photographing scenario. In some embodiments, the ISP may be disposed in the camera 193.

The camera 193 is configured to capture a static image or a video. An optical image of an object is generated through the lens, and is projected onto the photosensitive element. The photosensitive element may be a charge coupled device (CCD) or a complementary metal-oxide-semiconductor (CMOS) phototransistor. The photosensitive element converts an optical signal into an electrical signal, and then transmits the electrical signal to the ISP to convert the electrical signal into a digital image signal. The ISP outputs the digital image signal to the DSP for processing. The DSP converts the digital image signal into an image signal in a standard format such as RGB or YUV. In some embodiments, the terminal 100 may include one or N cameras 193, where N is a positive integer greater than 1.

The digital signal processor is configured to process a digital signal, and may process another digital signal in addition to the digital image signal.

The video codec is configured to compress or decompress a digital video. The terminal 100 may support one or more video codecs. In this way, the terminal 100 may play or record videos in a plurality of encoding formats, for example, moving picture experts group (MPEG)-1, MPEG-2, MPEG-3, and MPEG-4.

The NPU is a neural-network (NN) computing processor, quickly processes input information by referring to a structure of a biological neural network, for example, by referring to a mode of transfer between human brain neurons, and may further continuously perform self-learning. Applications such as intelligent cognition of the terminal 100 may be implemented through the NPU, for example, image recognition, facial recognition, speech recognition, and text understanding The external memory interface 120 may be used to connect to an external memory card, for example, a micro SD card, to extend a storage capability of the terminal 100. The external memory card communicates with the processor 110 through the external memory interface 120, to implement a data storage function. For example, files such as music and videos are stored in the external storage card.

The internal memory 121 may be configured to store computer-executable program code. The executable program code includes instructions. The processor 110 runs the instructions stored in the internal memory 121, to implement various function applications and data processing of the terminal 100. The internal memory 121 may include a program storage area and a data storage area. The program storage area may store an operating system, an application required by at least one function (for example, a voice playing function or an image playing function), and the like. The data storage area may store data (for example, audio data or a phone book) created in a process of using the terminal 100, and the like. In addition, the internal memory 121 may include a high-speed random access memory, or may include a nonvolatile memory, for example, at least one magnetic disk storage device, a flash memory, or a universal flash storage (universal flash storage, UFS).

The terminal 100 may implement audio functions such as music playing and recording by using the audio module 170, the speaker 170A, the receiver 170B, the microphone 170C, the headset jack 170D, the application processor, and the like. In some feasible embodiments, the audio module 170 may be configured to play a sound corresponding to a video. For example, when the display screen 194 displays a video play picture, the audio module 170 outputs a video play sound.

The audio module 170 is configured to convert digital audio information into an analog audio signal for output, and is also configured to convert analog audio input into a digital audio signal.

The speaker 170A, also referred to as a "loudspeaker", is configured to convert an audio electrical signal into a sound signal.

The receiver 170B, also referred to as an "earpiece", is configured to convert an electrical audio signal into a sound signal.

The microphone 170C, also referred to as a "mike" or a "mic", is configured to convert a sound signal into an electrical signal.

The headset jack 170D is configured to connect to a wired headset. The headset jack 170D may be a USB interface 130, or may be a 3.5 mm open mobile terminal platform (OMTP) standard interface or cellular telecommunications industry association of the USA (CTIA) standard interface.

The pressure sensor 180A is configured to sense a pressure signal, and can convert the pressure signal into an electrical signal. In some embodiments, the pressure sensor 180A may be disposed on the display screen 194. The gyroscope sensor 180B may be configured to determine a motion posture of the terminal 100. The barometric pressure sensor 180C is configured to measure barometric pressure.

The acceleration sensor 180E may detect magnitudes of acceleration of the terminal 100 in various directions (including three or six axes), may detect a magnitude and a direction of gravity when the terminal 100 is still, and may be further configured to recognize a posture of the terminal, and applied to an application such as switching between a landscape mode and a portrait orientation or a pedometer.

The distance sensor 180F is configured to measure a distance.

The ambient light sensor 180L is configured to sense ambient light brightness.

The fingerprint sensor 180H is configured to collect a fingerprint.

The temperature sensor 180J is configured to detect a temperature.

The touch sensor 180K is also referred to as a touch panel. The touch sensor 180K may be disposed on the display screen 194, and the touch sensor 180K and the display screen 194 constitute a touchscreen, which is also referred to as a "touchscreen". The touch sensor 180K is configured to detect a touch operation performed on or near the touch sensor. The touch sensor may transfer the detected touch operation to the application processor to determine a type of the touch event. A visual output related to the touch operation may be provided through the display screen 194. In some other embodiments, the touch sensor 180K may alternatively be disposed on a surface of the terminal 100 at a position different from that of the display screen 194.

The button 190 includes a power button, a volume button, and the like. The button 190 may be a mechanical button or a touch button. The terminal 100 may receive a button input, and generate a button signal input related to user setting and function control of the terminal 100.

The motor 191 may generate a vibration prompt.

The indicator 192 may be an indicator light, and may be configured to indicate a charging status and a power change, or may be configured to indicate a message, a missed call, a notification, and the like.

The SIM card interface 195 is configured to connect to a SIM card.

Figure 13:
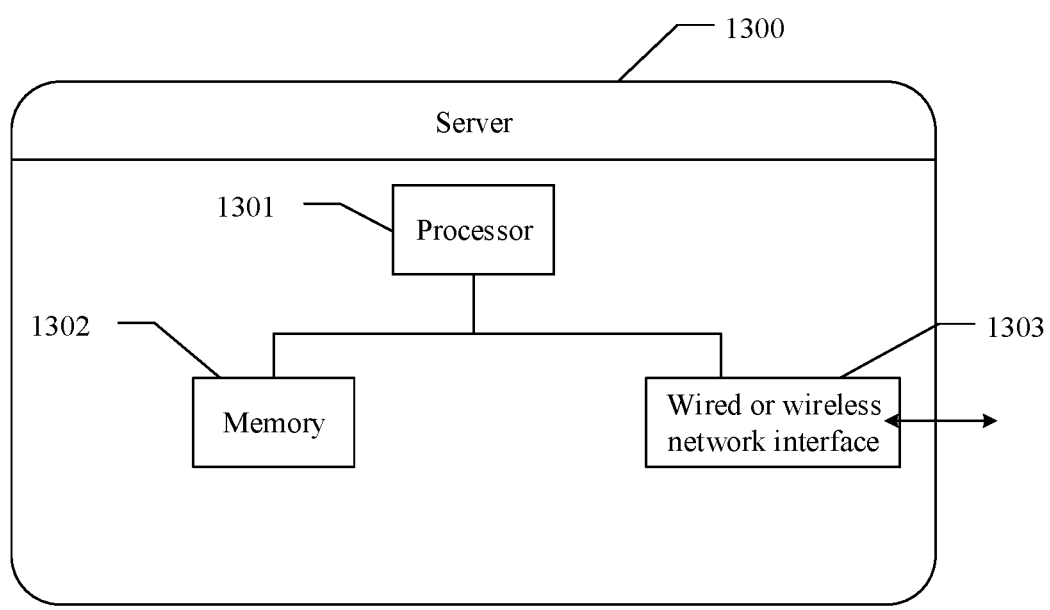
FIG. 13 is a schematic diagram of an embodiment of a server according to an embodiment of this application.

FIG. 13 is a schematic diagram of an embodiment of a server according to an embodiment of this application.

The server 1300 provided in this embodiment may vary greatly with configuration or performance, and may include one or more processors 1301 and a memory 1302. The memory 1302 stores a program or data.

The memory 1302 may be a volatile memory or a non-volatile memory. Optionally, the processor 1301 is one or more central processing units (CPU), and the CPU may be a single-core CPU or a multi-core CPU. The processor 1301 may communicate with the memory 1302, and execute a series of instructions in the memory 1302 on the server 1300.

The server 1300 further includes one or more wired or wireless network interfaces 1303, for example, an Ethernet interface.

Optionally, although not shown in FIG. 13, the server 1300 may further include one or more power supplies and one or more input/output interfaces. The input/output interface may be configured to be connected to a display, a mouse, a keyboard, a touchscreen device, a sensor device, or the like. The input/output interface is an optional component, and may exist or may not exist. This is not limited herein.

For a procedure performed by the processor 1301 in the server 1300 in this embodiment, refer to the method procedure described in the foregoing method embodiments. Details are not described herein.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, division into the units is merely logical function division and may be other division in actual embodiment. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, function units in embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of the software functional unit and sold or used as an independent product, the integrated unit may be stored in a computer-readable storage medium. Based on such an understanding, the technical solutions of this application essentially, or the part contributing to the prior art, or all or some of the technical solutions may be implemented in the form of a software product. The computer software product is stored in a storage medium and includes several instructions for instructing a computer device (which may be a personal computer, a server, or a network device) to perform all or some of the operations of the methods described in embodiments of this application. The foregoing storage medium includes any medium that can store program code, for example, a USB flash drive, a removable hard disk, a read-only memory (ROM), a random access memory (RAM), a floppy disk, or a compact disc.

The foregoing embodiments are merely intended for describing the technical solutions of this application other than limiting this application. Although this application is described in detail with reference to the foregoing embodiments, a person of ordinary skill in the art should understand that they may still make modifications to the technical solutions described in the foregoing embodiments or make equivalent replacements to some technical features thereof, without departing from the scope of the technical solutions of embodiments of this application.

What is claimed is:

1. A word completion method, comprising:
   obtaining, by a processing system, a character string entered by a user;
   searching, by the processing system, a trie tree for a target node that matches the character string, to output at least one word, wherein the trie tree comprises a plurality of first nodes, the target node is one of the plurality of first nodes, each first node stores one or more words, the one or more words comprise a character string that comprises characters passing through a path from a root node to a first node in which the one or more words are located in the trie tree, and one or more words stored in the target node comprise the at least one output word,
   wherein the first node further stores a completion probability corresponding to each of the one or more words, the completion probability corresponding to each word indicates a probability of outputting the word when the first node is matched, and the completion probability corresponding to each of the one or more words satisfied a first threshold, and
   wherein the trie tree comprises a plurality of second nodes that each store no word, a second node of the plurality of second nodes is an intervening node between the root node to the first node, and wherein words associated with the second node are deleted prior to receipt of a query in response to a determination that have a completion probability that the words associated with the second node each have a completion probability that fails to satisfy the first threshold; and
   outputting, by the processing system at least one word based on the searching of the trie tree.

2. The method according to claim 1, wherein the one or more words are prefixed with the character string that comprises the characters passing through the path from the root node to the first node in which the one or more words are located in the trie tree.

3. The method according to claim 1, wherein the character string comprises a first character to an $N^{th}$ character arranged in an input order of the user, and the searching the trie tree for the target node that matches the character string, to output at least one word, comprises:
   searching the trie tree based on the input order, wherein a character string that comprises the first character to an $(N-1)^{th}$ character entered by the user matches a second node in the trie tree.

4. The method according to claim 1, wherein the first node stores at least one piece of data of a key-value structure, the key-value structure comprises a key and a value associated with the key, the key is a word prefixed with the character string that comprises the characters passing through the path from the root node to the first node, the value is a completion probability of the word, and the completion probability indicates a probability of outputting the key when the first node is matched.

5. The method according to claim 1, wherein an order of the at least one output word is related to an arrangement order of the one or more words stored in the target node.

6. The method according to claim 1, wherein words stored in the plurality of first nodes are from point of information (POI) data or user log data.

7. A word completion method, comprising:
   obtaining, by a system, a character string entered by a user; and
   searching, by the system, a trie tree for a target node that matches the character string, to output a first word set, wherein the first word set comprises at least one word, the first trie tree comprises a plurality of first nodes, the target node is one of the plurality of first nodes, each first node stores at least one word that comprises a character string that comprises characters passing through a path from a root node to the first node in the trie tree, one or more words stored in the target node comprise a word in the first word set, and words stored in the plurality of first nodes are from a first word database,
   wherein the first node further stores a completion probability corresponding to each of the one or more words, the completion probability corresponding to each word indicates a probability of outputting the word when the first node is matched, and the completion probability corresponding to each of the one or more words satisfied a first threshold, and
   wherein the trie tree comprises a plurality of second nodes that each store no word, a second node of the plurality of second nodes is an intervening node between the root node to the first node, and wherein words associated with the second node are deleted prior to receipt of a query in response to a determination that have a completion probability that the words associated with the second node each have a completion probability that fails to satisfy the first threshold;
   outputting, by the system based on a second word database, a second word set prefixed with the character string; and
   outputting, by the system based on the first word set and the second word set, at least one word recommended to the user.

8. The method according to claim 7, wherein:
   the first word set comprises at least two words arranged in a first ordered manner;
   the second word set comprises at least two words arranged in a second ordered manner; and
   a target word set comprises a first word ranked first in the first word set and a second word ranked first in the second word set.

9. The method according to claim 7, wherein the outputting, based on the first word set and the second word set, at least one word recommended to the user comprises:
   outputting, based on a probability of outputting each word in a union set of the first word set and the second word set, the at least one word recommended to the user, wherein the probability of outputting each word in the union set is determined based on a preset first weight of the first word set and a preset second weight of the second word set.

10. The method according to claim 7, wherein the outputting, based on the second word database, the second word set prefixed with the character string comprises:
    obtaining the second word set based on a trie tree constructed from a user log word database;

inputting the character string into a machine learning algorithm trained based on the user log word database, to output the second word set; or obtaining the second word set based on a hash tree constructed from the user log word database.

11. An apparatus, comprising:

a memory; and at least one processor, coupled with the memory, wherein the memory stores program instructions, and when the program instructions are run by the at least one processor, the at least one processor performs the following operations:

obtaining a character string entered by a user;

searching a trie tree for a target node that matches the character string, to output at least one word, wherein the trie tree comprises a plurality of first nodes, the target node is one of the plurality of first nodes, each first node stores one or more words, the one or more words comprise a character string that comprises characters passing through a path from a root node to a first node in which the one or more words are located in the trie tree, and one or more words stored in the target node comprise the at least one output word, wherein the first node further stores a completion probability corresponding to each of the one or more words, the completion probability corresponding to each word indicates a probability of outputting the word when the first node is matched, and the completion probability corresponding to each of the one or more words satisfied a first threshold, and wherein the trie tree comprises a plurality of second nodes that each store no word, a second node of the plurality of second nodes is an intervening node between the root node to the first node, and wherein words associated with the second node are deleted prior to receipt of a query in response to a determination that have a completion probability that the words associated with the second node each have a completion probability that fails to satisfy the first threshold; and outputting, by the processing system at least one word based on the searching of the trie tree.

12. The apparatus according to claim 11, wherein the one or more words are prefixed with the character string that comprises the characters passing through the path from the root node to the first node in which the one or more words are located in the trie tree.

13. The apparatus according to claim 11, wherein the character string comprises a first character to an $N^{th}$ character arranged in an input order of the user, and the searching the trie tree for the target node that matches the character string, to output at least one word, comprises:

searching the trie tree based on the input order, wherein a character string that comprises the first character to an $(N-1)^{th}$ character entered by the user matches a second node in the trie tree.

14. The apparatus according to claim 11, wherein the first node stores at least one piece of data of a key-value structure, the key-value structure comprises a key and a value associated with the key, the key is a word prefixed with the character string that comprises the characters passing through the path from the root node to the first node, the value is a completion probability of the word, and the completion probability indicates a probability of outputting the key when the first node is matched.

15. The apparatus according to claim 11, wherein an order of the at least one output word is related to an arrangement order of the one or more words stored in the target node.

16. The apparatus according to claim 11, wherein words stored in the plurality of first nodes are from point of information (POI) data or user log data.

* * * * *